US012784241B2

(12) United States Patent
Hayashi

(10) Patent No.: US 12,784,241 B2
(45) Date of Patent: Nov. 3, 2026

(54) IMAGE PROCESSING APPARATUS, IMAGE PROCESSING METHOD, AND PROGRAM

(71) Applicant: FUJIFILM Corporation, Tokyo (JP)

(72) Inventor: Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 18/611,619

(22) Filed: Mar. 20, 2024

(65) Prior Publication Data

US 2024/0233149 A1 Jul. 11, 2024

Related U.S. Application Data

(63) Continuation of application No. PCT/JP2022/029221, filed on Jul. 29, 2022.

(30) Foreign Application Priority Data

Sep. 22, 2021 (JP) ................................ 2021-154104

(51) Int. Cl.
*G06T 7/33* (2017.01)
*G06T 7/12* (2017.01)
(Continued)

(52) U.S. Cl.
CPC ................ *G06T 7/337* (2017.01); *G06T 7/12* (2017.01); *G06T 7/50* (2017.01); *G06T 7/73* (2017.01);
(Continued)

(58) Field of Classification Search
CPC ........ C07D 305/06; G06T 2207/10032; G06T 2207/30184; G06T 2207/30244;
(Continued)

(56) References Cited

U.S. PATENT DOCUMENTS

2006/0210338 A1* 9/2006 Hirano .................. G06T 7/0006 400/62
2019/0392609 A1* 12/2019 Bae ........................... G06T 7/74

FOREIGN PATENT DOCUMENTS

CN 111586360 A * 8/2020 ............... H04N 7/18
JP 2003-316259 A 11/2003
(Continued)

OTHER PUBLICATIONS

International Search Report issued in PCT/JP2022/029221; mailed Sep. 20, 2022.
(Continued)

*Primary Examiner* — Ming Wu
(74) *Attorney, Agent, or Firm* — Studebaker Brackett PLLC

(57) ABSTRACT

One or more processors acquire a captured image, acquire three-dimensional position information indicating positions of specific points in a space of an imaging target range, set a value of a parameter of perspective projection transformation of transforming the three-dimensional position information into two-dimensional image coordinates based on an imaging condition of the captured image, transform the position information of the specific points into data of the image coordinates by using the perspective projection transformation, evaluate a rate of match between a first line segment extracted based on the data of the image coordinates obtained by the transformation and a second line segment extracted from the captured image, evaluate the rate of match a plurality of times while changing the value of the parameter of the perspective projection transformation, and associate the captured image with the positions of the specific points based on results of the evaluation.

24 Claims, 13 Drawing Sheets

(51) Int. Cl.

| | |
|---|---|
| ***G06T 7/50*** | (2017.01) |
| ***G06T 7/73*** | (2017.01) |
| ***G06V 10/776*** | (2022.01) |
| ***G06V 20/17*** | (2022.01) |

(52) U.S. Cl.
CPC ............ *G06V 10/776* (2022.01); *G06V 20/17* (2022.01); *G06T 2207/10032* (2013.01); *G06T 2207/30184* (2013.01); *G06T 2207/30244* (2013.01)

(58) Field of Classification Search
CPC .. G06T 7/12; G06T 7/337; G06T 7/50; G06T 7/55; G06T 7/73; G06V 10/776; G06V 20/17
See application file for complete search history.

(56) References Cited

FOREIGN PATENT DOCUMENTS

| | | | | |
|---|---|---|---|---|
| JP | 2004-198530 A | | 7/2004 | |
| JP | 2010-107224 A | | 5/2010 | |
| WO | WO-2017144049 A1 | * | 8/2017 | ............. G09B 9/003 |

OTHER PUBLICATIONS

International Preliminary Report on Patentability (Chapter I) and Written Opinion of the International Searching Authority issued in PCT/JP2022/029221; issued Mar. 26, 2024.

* cited by examiner $$\begin{pmatrix} X \\ Y \\ Z \end{pmatrix} = Mr * Mt * Mh \begin{pmatrix} x' \\ y' \\ z' \end{pmatrix}$$

$$\begin{pmatrix} u \\ v \end{pmatrix} = \begin{pmatrix} \frac{f}{p} * \frac{X}{Z} + Uc \\ \frac{f}{p} * \frac{Y}{Z} + Vc \end{pmatrix}$$

IMAGE PROCESSING APPARATUS, IMAGE PROCESSING METHOD, AND PROGRAM

CROSS-REFERENCE TO RELATED APPLICATIONS

The present application is a Continuation of PCT International Application No. PCT/JP2022/029221 filed on Jul. 29, 2022 claiming priority under 35 U.S.C § 119(a) to Japanese Patent Application No. 2021-154104 filed on Sep. 22, 2021. Each of the above applications is hereby expressly incorporated by reference, in its entirety, into the present application.

BACKGROUND OF THE INVENTION

1. Field of the Invention

The present disclosure relates to an image processing apparatus, an image processing method, and a program, and more particularly, to an image processing technique including processing of associating a captured image captured by a camera with a position in a space of an imaging target range.

2. Description of the Related Art

JP2003-316259A describes a captured video processing method of imaging a ground surface from an imaging apparatus mounted on an airframe in the air and identifying a situation existing on the ground surface. In the method described in JP2003-316259A, an imaging position in the air is three-dimensionally specified, an imaging range of the imaged ground surface is calculated and obtained, a captured video is deformed in accordance with the imaging range, and then the deformed captured video is displayed by being superimposed on a map of map information system.

SUMMARY OF THE INVENTION

In the technique described in JP2003-316259A, the imaging range is calculated by specifying a camera position and a posture of the camera from output signals obtained from detection units, such as an airframe position detection unit, an airframe posture detection unit, and a camera posture detection unit, provided in a flying object, and the registration with the map is performed. However, in an actual system, in a case in which calculation is performed based on the camera position and the posture understood from the output signals obtained from detection units, such as the airframe position detection unit, the airframe posture detection unit, and the camera posture detection unit, a deviation between an actual imaging range and the calculation result is larger, and there is a problem that the accuracy of the registration between the map and the captured image is poor.

The present disclosure has been made in view of such circumstances, and an object thereof is to provide an image processing apparatus, an image processing method, and a program that enable to perform highly accurate registration between a position in a space of an imaging target range and a captured image.

An aspect of the present disclosure relates to an image processing apparatus comprising: one or more processors; and one or more memories that store a program to be executed by the one or more processors, in which the one or more processors execute a command of the program to acquire a captured image captured by using a camera, acquire three-dimensional position information indicating positions of a plurality of specific points in a space of an imaging target range, set a value of a parameter of perspective projection transformation of transforming the three-dimensional position information into two-dimensional image coordinates based on an imaging condition of the captured image, transform the position information of the plurality of specific points into data of the image coordinates by using the perspective projection transformation, evaluate a rate of match between a first line segment extracted based on the data of the image coordinates obtained by the transformation and a second line segment extracted from the captured image, perform the evaluation of the rate of match a plurality of times while changing the value of the parameter of the perspective projection transformation, and associate the captured image with the positions of the plurality of specific points based on results of the evaluation performed a plurality of times.

In the image processing apparatus according to the present aspect, the one or more processors set and change the value of the parameter of the perspective projection transformation based on the imaging condition, evaluate the rate of match between the first line segment extracted from data of a transformation result and the second line segment extracted from the captured image, for each transformation result, and search for the parameter value. Accordingly, the parameter value with good evaluation of the rate of match can be obtained, and highly accurate registration between the position of the specific point in the space of the imaging target range and the captured image captured by the camera can be performed.

The "imaging condition" includes, for example, at least one condition related to a position or a posture of the camera during the imaging. The captured image may be an image captured from the air. The term "in the air" includes the concept of "sky". The image captured by using the camera mounted on the flying object is an example of an "image captured from the air".

The plurality of specific points may be points in a geographical space of the imaging target range. The specific point may be a point of specifying a geographical position of a feature, such as a building or a road. The specific point may be a virtual point of specifying a position of a roof estimated from a height of the building.

In the image processing apparatus according to another aspect of the present disclosure, the one or more processors may acquire map data corresponding to the imaging target range, and may acquire the position information of the plurality of specific points from the map data.

In the image processing apparatus according to still another aspect of the present disclosure, the map data may include data of latitude, longitude, and altitude, and the one or more processors may transform the map data into rectangular coordinate data. The "altitude" includes the concept of elevation. In a case in which the position information included in the map data is coordinate data of a geographical coordinate system, it is preferable that the one or more processors transform the geographical coordinate data into the rectangular coordinate data.

In the image processing apparatus according to still another aspect of the present disclosure, the plurality of specific points may include points of specifying a shape of a house. The points of specifying the shape of the house include a point constituting an outer periphery of the house and a point of specifying a height of the house.

In the image processing apparatus according to still another aspect of the present disclosure, the plurality of specific points may include points of specifying a position of a road.

In the image processing apparatus according to still another aspect of the present disclosure, a transformation matrix used for the perspective projection transformation may include a plurality of the parameters, and the one or more processors may perform the evaluation of the rate of match a plurality of times while changing a combination of values of the plurality of parameters.

The plurality of parameters may be parameters related to a position and a posture of the camera that captures the captured image.

In the image processing apparatus according to still another aspect of the present disclosure, the captured image may be an image captured by using the camera mounted on a flying object, and the one or more processors may acquire camera position information indicating a position of the camera during capturing of the captured image and posture information indicating a posture of the camera during the capturing of the captured image, and may decide a search range in which the value of the parameter is searched for, based on the camera position information and the posture information.

In the image processing apparatus according to still another aspect of the present disclosure, the camera position information may include data of latitude, longitude, and altitude, and the posture information may include data of an azimuthal angle, a tilt angle, and a roll angle indicating an inclination from horizontal.

In the image processing apparatus according to still another aspect of the present disclosure, the camera position information and the posture information may be acquired from sensor data obtained by a sensor disposed in at least one of the camera or the flying object.

In the image processing apparatus according to still another aspect of the present disclosure, the one or more processors may make a weight for the evaluation of the rate of match different between a central portion and a peripheral portion of the captured image. For example, in a case in which the accuracy of the registration in the central portion of the captured image is emphasized, it is preferable that weighting is performed in which the evaluation of the central portion is relatively emphasized more than the evaluation of the peripheral portion.

In the image processing apparatus according to still another aspect of the present disclosure, the one or more processors may select the value of the parameter at which the rate of match is highest, based on the results of the evaluation performed a plurality of times. According to the present aspect, the value of the parameter of the perspective projection transformation can be automatically selected with good registration accuracy.

In the image processing apparatus according to still another aspect of the present disclosure, the one or more processors may generate a composite image in which the first line segment generated by using the perspective projection transformation defined by the selected value of the parameter is superimposed on the captured image.

In the image processing apparatus according to still another aspect of the present disclosure, the one or more processors may perform processing of displaying a plurality of results with superior evaluation records among the evaluations performed a plurality of times, and may receive an instruction to select one result from among the plurality of results with the superior evaluation records.

According to the present aspect, the plurality of results with the superior evaluation records can be presented to the user, and the user can select one result determined to be appropriate from the plurality of results.

In the image processing apparatus according to still another aspect of the present disclosure, the one or more processors may generate a composite image in which the first line segment generated by using the perspective projection transformation defined by the value of the parameter corresponding to the selected result is superimposed on the captured image in accordance with the received instruction.

In the image processing apparatus according to still another aspect of the present disclosure, the plurality of specific points may include points of specifying a shape of a house, and the composite image may be an image in which a figure indicating a region of the house using the first line segment is superimposed on the captured image.

In the image processing apparatus according to still another aspect of the present disclosure, the one or more processors may receive input of an instruction to move the figure indicating the region of the house displayed by being superimposed on the captured image, and may move the figure on the captured image in accordance with the input instruction.

In the image processing apparatus according to still another aspect of the present disclosure, the one or more processors may cut out an image area of the house surrounded by the figure from the captured image.

According to the present aspect, the image area of each house can be accurately extracted from the captured image.

The image processing apparatus according to still another aspect of the present disclosure may further comprise a display unit that displays a result of the association between the captured image and the positions of the plurality of specific points, and an input unit for inputting an instruction from a user.

Still another aspect of the present disclosure relates to an image processing method executed by one or more processors, the image processing method including: causing the one or more processors to acquire a captured image captured by using a camera, acquire three-dimensional position information indicating positions of a plurality of specific points in a space of an imaging target range, set a value of a parameter of perspective projection transformation of transforming the three-dimensional position information into two-dimensional image coordinates based on an imaging condition of the captured image, transform the position information of the plurality of specific points into data of the image coordinates by using the perspective projection transformation, evaluate a rate of match between a first line segment extracted based on the data of the image coordinates obtained by the transformation and a second line segment extracted from the captured image, perform the evaluation of the rate of match a plurality of times while changing the value of the parameter of the perspective projection transformation, and associate the captured image with the positions of the plurality of specific points based on results of the evaluation performed a plurality of times.

Still another aspect of the present disclosure relates to a program causing a computer to implement: a function of acquiring a captured image captured by using a camera; a function of acquiring three-dimensional position information indicating positions of a plurality of specific points in a space of an imaging target range; a function of setting a value of a parameter of perspective projection transformation of transforming the three-dimensional position information into two-dimensional image coordinates based on an imaging condition of the captured image; a function of transforming the position information of the plurality of specific points into data of the image coordinates by using the perspective projection transformation; a function of evaluating a rate of match between a first line segment extracted based on the data of the image coordinates obtained by the transformation and a second line segment extracted from the captured image; a function of performing the evaluation of the rate of match a plurality of times while changing the value of the parameter of the perspective projection transformation; and a function of associating the captured image with the positions of the plurality of specific points based on results of the evaluation performed a plurality of times.

According to the present disclosure, it is possible to perform the highly accurate registration between the position in the space of the imaging target range and the captured image.

DESCRIPTION OF THE PREFERRED EMBODIMENTS

Figure 1:
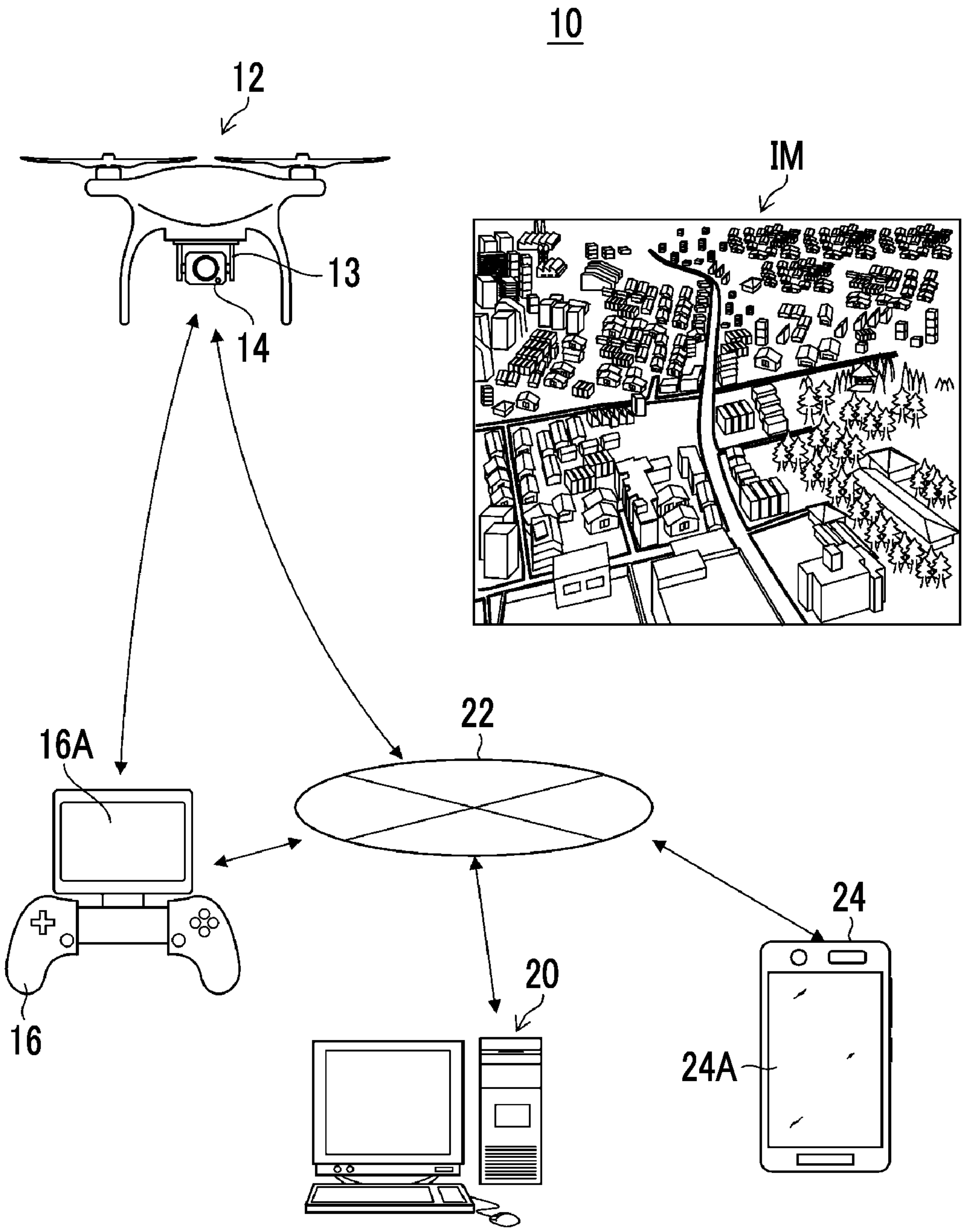
FIG. 1 is a schematic diagram showing a configuration example of a captured image processing system according to an embodiment.

Hereinafter, a detailed description of a preferred embodiment of the present invention will be made with reference to the accompanying drawings. In the present specification, the same reference numeral will be given to the same configuration element and overlapping description thereof will be omitted as appropriate.

FIG. 1 is a schematic diagram showing a configuration example of a captured image processing system 10 according to the embodiment. The captured image processing system 10 includes a drone 12 for aerial imaging, a camera 14 mounted on the drone 12, a remote controller 16, and an image processing apparatus 20. The drone 12 is an unmanned aerial vehicle remotely operated by using the remote controller 16. The drone 12 may have an auto-pilot function of flying in accordance with a program. The drone 12 is an example of a “flying object” according to the present disclosure.

The camera 14 is mounted on the drone 12 via a gimbal head 13. The camera 14 includes an optical system, an image sensor, and a signal processing circuit (none of which are shown). The optical system includes one or more lenses, such as a focus lens. The image sensor may be, for example, a charge coupled device (CCD) image sensor or a complementary metal-oxide semiconductor (CMOS) image sensor.

The camera 14 generates digital image data of an imaged target by processing a signal obtained from the image sensor by the signal processing circuit. The digital image data generated by the camera 14 can be a “captured image”. The captured image captured by using the camera 14 can be stored in an internal storage built in the drone 12 and/or a storage device, such as a memory card, attachably and detachably mounted on the drone 12. Further, the image captured by using the camera 14 can be transmitted to the remote controller 16 or transmitted to the image processing apparatus 20 and a terminal apparatus 24 via wireless communication.

The remote controller 16 is a transmitter that controls operations of the camera 14 and the drone 12 via wireless communication. A format of the wireless communication may be a format of a wireless local area network (LAN), a communication format using, for example, a radio wave in a 2.4 GHz band or 5.7 GHz band, or a format using a mobile communication network. The communication formats of communication of a control signal for operating the drone 12 and communication for transmitting the image or the like captured by using the camera 14 may be different from each other or may be common to each other.

The remote controller 16 comprises left and right sticks for operating a flight operation of the drone 12, a lever for operating the gimbal head 13, an imaging button for giving an instruction to execute the imaging via the camera 14, and an imaging mode button for switching moving image capturing and still image capturing. It should be noted that, in a case in which a touch panel display is adopted as a display 16A, the imaging button, other operation buttons, and the like can be implemented by the touch panel display.

A live video captured by using the camera 14 can be displayed on the display 16A of the remote controller 16 and the like. In addition, the remote controller 16 can grasp a status of an airframe, such as a flight position and a flight speed, in real time based on data of various sensors provided in the drone 12. Flight information indicating the status of the airframe can be displayed on the display 16A.

A captured image IM shown in FIG. 1 is an example of an image captured by using the camera 14. In the present embodiment, at least one still image is captured from the air, and the captured image IM is processed in the image processing apparatus 20.

The image processing apparatus 20 is configured by using a computer. The computer applied to the image processing apparatus 20 may be a server, a personal computer, or a workstation.

The image processing apparatus 20 can perform data communication with the remote controller 16 and the terminal apparatus 18 via a network 22. The network 22 may be a local area network or a wide area network. The image processing apparatus 20 acquires various types of information from the drone 12 and the camera 14. The image processing apparatus 20 can acquire map data of an imaging target range from a geographical information system (not shown) via the network 22. The map data may be acquired in advance before the imaging, or may be acquired after the imaging.

The terminal apparatus 24 may be a mobile information terminal, such as a smartphone or a tablet terminal. The terminal apparatus 24 comprises a display 24A. The terminal apparatus 24 may have a function of the remote controller 16. Further, the terminal apparatus 24 may have a processing function of the image processing apparatus 20.

[Configuration Example of Drone Equipped with Camera]

Figure 2:
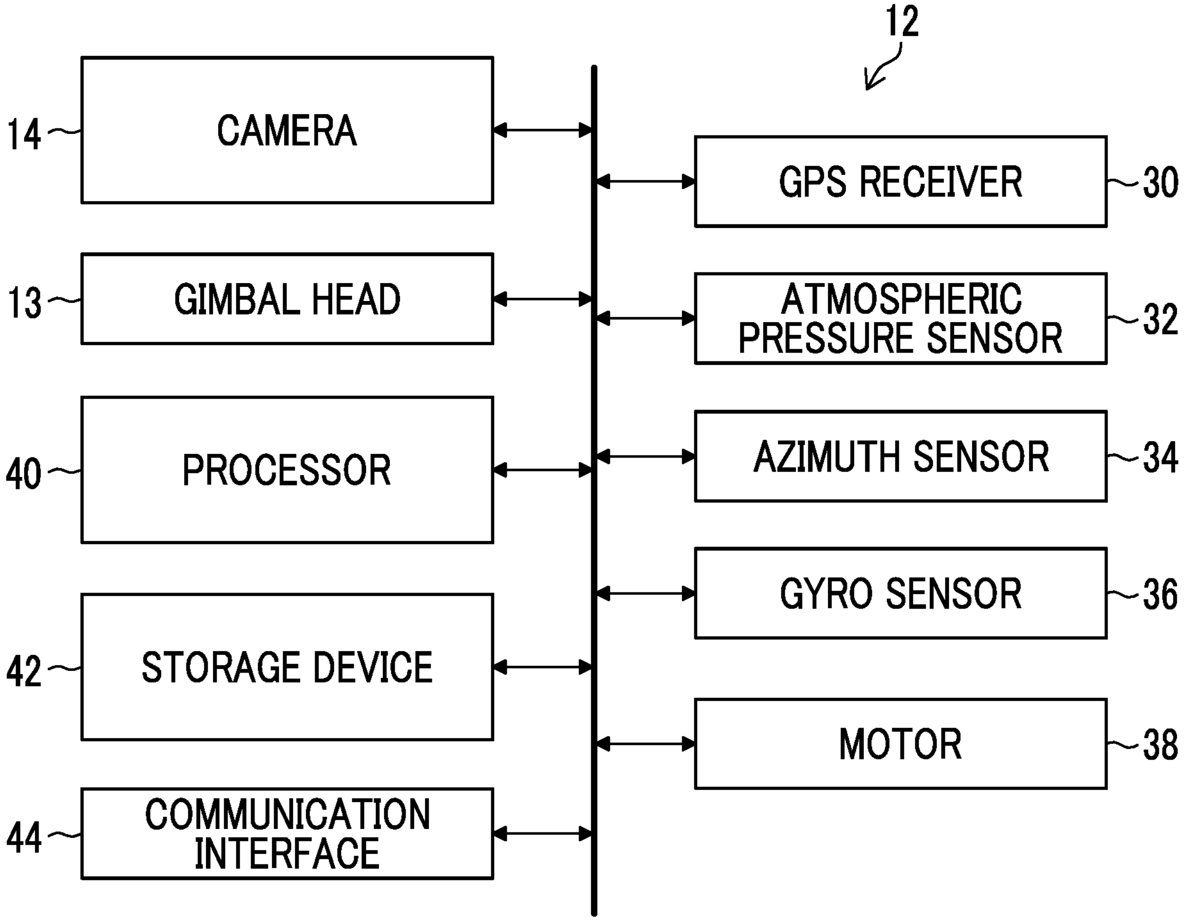
FIG. 2 is a block diagram schematically showing an example of an electric configuration of a drone on which a camera is mounted.

FIG. 2 is a block diagram schematically showing an example of an electric configuration of the drone 12 on which the camera 14 is mounted. The drone 12 includes a global positioning system (GPS) receiver 30, an atmospheric pressure sensor 32, an azimuth sensor 34, a gyro sensor 36, and a motor 38. The motor 38 is a power source for rotating a rotor (not shown), and the drone 12 includes a plurality of the motors 38 that drive a plurality of rotors.

The GPS receiver 30 acquires position information including the latitude and the longitude of the drone 12. The atmospheric pressure sensor 32 detects an atmospheric pressure in the drone 12. The drone 12 can acquire the altitude of the drone 12 based on the atmospheric pressure detected by using the atmospheric pressure sensor 32. The term "acquisition" includes the concept of generating information through data processing, such as calculation. The latitude, the longitude, and the altitude of the drone 12 constitute the position information of the drone 12 and the camera 14.

The azimuth sensor 34 may be, for example, a geomagnetic sensor. The azimuthal angle to which the lens of the camera 14 is oriented can be detected by the azimuth sensor 34.

The gyro sensor 36 detects a roll angle indicating a rotation angle with respect to a roll axis, a pitch angle indicating a rotation angle with respect to a pitch axis, and a yaw angle indicating a rotation angle with respect to a yaw axis. The drone 12 acquires posture information of the drone 12 based on the rotation angles acquired by using the gyro sensor 36. It should be noted that a part or all of sensors, such as the GPS receiver 30, the atmospheric pressure sensor 32, the azimuth sensor 34, and the gyro sensor 36, may be disposed on the camera 14 side.

The drone 12 comprises a processor 40, a storage device 42, and a communication interface 44. The storage device 42 may be a memory, an internal storage, an external storage device, or a combination thereof. The processor 40 acts as a flight controller, and performs various operations necessary for flight control of the drone 12 based on sensor data obtained from various sensors.

The communication interface 44 is a communication unit that performs the wireless communication with the remote controller 16 and the like. It should be noted that the communication interface 44 may comprise a communication terminal corresponding to wired communication. Further, the drone 12 comprises a battery and a charging terminal of the battery (none of which are shown).

<<Description of Technical Problem of Processing on Captured Image IM>>

Figure 3:
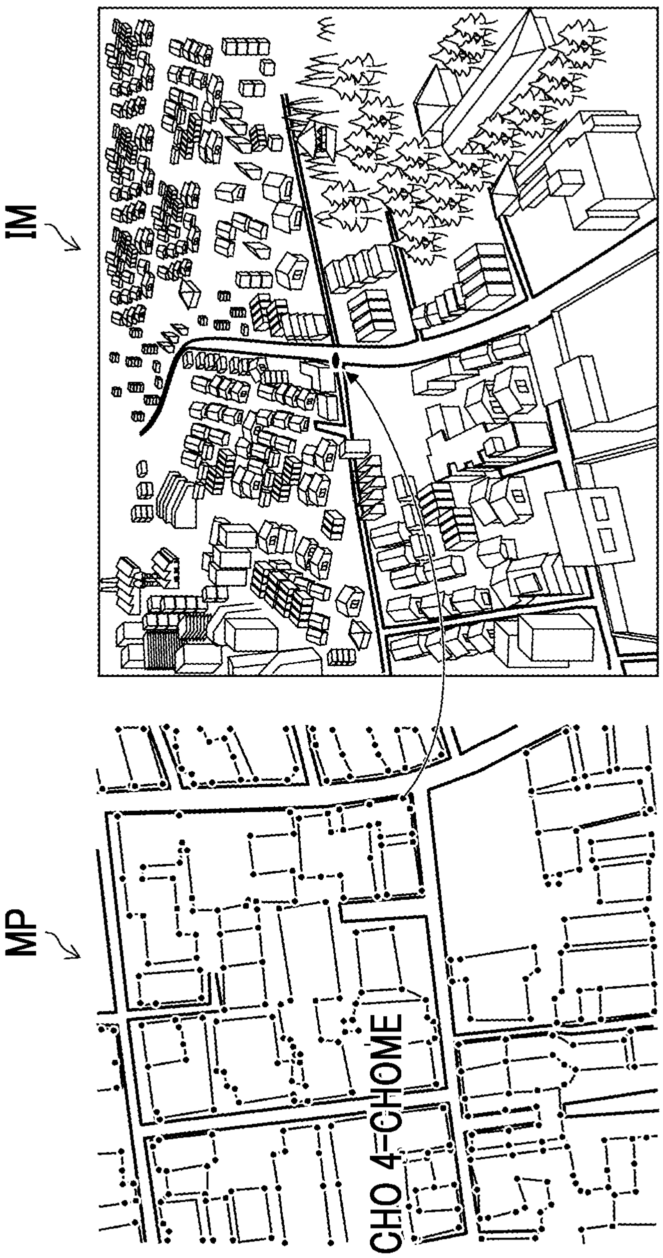
FIG. 3 is an example of a captured image corresponding to map data including position data indicating a position of a house.

Here, a case in which processing of identifying a position of a house shown in the image from the captured image IM obtained by imaging the ground from the air will be described as an example. In this case, as shown in FIG. 3, based on map data MP including position data indicating the position of the house and the captured image IM, a position on the captured image IM corresponding to cach of a plurality of specific points indicated by black circle dots in the map data MP is identified.

In the map data MP, a house identification (ID) as an identification code for identifying each house is assigned to each house, and the position data indicating positions of the plurality of specific points constituting an outer periphery of the house is recorded in association with the house ID. The position data of cach specific point is three-dimensional data of the latitude, the longitude, and the altitude. In a case of Japan, such map data MP including the geographical coordinate data can be acquired from, for example, the basic map information provided by the Geographical Information Institute. Alternatively, such map data MP can also be acquired from a database on an Open Street Map.

A problem of identifying the position on the captured image IM corresponding to the specific point on the map data MP is understood as a problem of obtaining a correspondence between three-dimensional spatial coordinates and two-dimensional image coordinates.

<<Camera Matrix>>

In order to solve the problem of obtaining the correspondence between the three-dimensional spatial coordinates and the two-dimensional image coordinates, a camera matrix as a transformation matrix for perspective projection transformation need only be obtained from the following expression based on a camera model.

Image coordinates $(u, v)$=camera matrix*three-dimensional coordinates $(x, y, z)$ The camera matrix can be indicated by a product of an internal parameter matrix and an external parameter matrix. The external parameter matrix is a matrix that is used for transformation from the three-dimensional coordinates (world coordinates) to the camera coordinates. The external parameter matrix is a matrix determined by the camera position and the posture (imaging angle) during the imaging, and includes a translation parameter and a rotation parameter.

The internal parameter matrix is a matrix that is used for transformation from the camera coordinates to the image coordinates, and is a matrix that is determined by the specifications of the camera 14, such as a focal length of the camera, a sensor size of the image sensor, and an aberration (distortion).

The three-dimensional coordinates (x, y, z) are transformed into the camera coordinates by using the external parameter matrix, and the camera coordinates are transformed into the image coordinates (u, v) by using the internal parameter matrix, thereby associating (transforming) the three-dimensional coordinates (x, y, z) with (into) the image coordinates (u, v).

The internal parameter matrix can be specified in advance. On the other hand, since the external parameter matrix depends on the camera position and the posture during the imaging, it is necessary to set the external parameter matrix for each captured image.

In a case in which the number of correspondence points of the three-dimensional coordinates in the actual three-dimensional space and the image coordinates in the captured image is six or more, the camera matrix can be calculated. However, it takes time and effort for a person to designate a plurality of correspondence points.

In this regard, in the image processing apparatus 20 according to the present embodiment, even in a case in which a person does not designate the correspondence point, it is possible to automatically obtain the camera matrix (transformation matrix) based on an imaging condition during the capturing of the captured image IM. Details of a specific processing method will be described below.

<<Problem in Case in Which Sensor Data is Used in External Parameter Matrix>>

It is conceivable to calculate, as the data indicating the position and the posture of the camera 14, the external parameter matrix by using the sensor data (sensor value) obtained from various sensors, such as the GPS receiver 30, the azimuth sensor, and the gyro sensor mounted on the drone 12. However, in the camera matrix actually obtained by using the sensor data, there is a problem that mapping of the position on the map cannot be correctly performed on the captured image.

Figure 4:
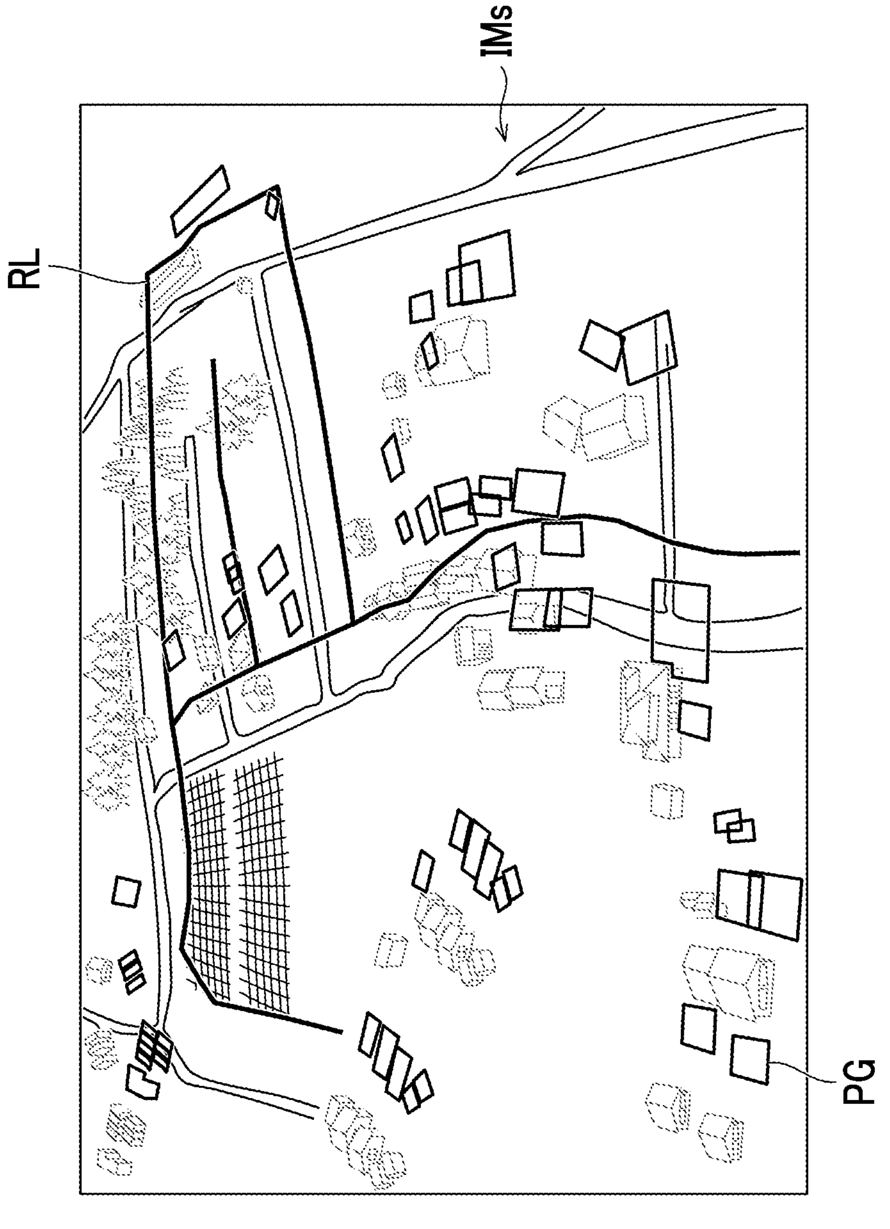
FIG. 4 is an example of a composite image in which positions of the house and a road, which are transformation results obtained by transforming the map data into image coordinates by applying sensor data to parameters of a camera matrix are superimposed on the captured image.

FIG. 4 is an example of a composite image in which the map data is transformed into the image coordinates by the camera matrix in which the sensor data is used for the parameter values, and the positions of the house and the road are superimposed on the captured image. In FIG. 4, each of a plurality of polygons PG superimposed on a captured image IMs represents the outer periphery of the house of the map transformed by using the camera matrix in which the sensor data is used for the parameter values. In addition, a line RL superimposed on the captured image IMs represents a road of the map transformed by using the same camera matrix. As shown in FIG. 4, the polygon PG and the line RL are significantly deviated from the positions of the house and the road in the captured image IMs. In the camera matrix in which the sensor data (sensor values) is used for the parameters of the position and the posture of the camera 14, there is an error in the sensor data, and mapping of the house or the like on the map cannot be correctly performed on the captured image IMs.

<<Outline of Image Processing Apparatus 20 According to Present Embodiment>>

The image processing apparatus 20 automatically searches for values of the parameters of the camera matrix based on the sensor data during the imaging, and obtains a value of an optimal parameter, that is, the camera matrix that can associate (perform registration of) the position on the map with the position on the captured image with high accuracy.

In the processing of searching for the values of the parameters of the camera matrix, the image processing apparatus 20 tweaks the values of the parameters with reference to the value of the sensor data, transforms the map data into the image coordinates by using the camera matrix of the parameter values, evaluate a rate of match between the transformation result and the position on the captured image, selects the parameter value with a best evaluation record, and decides the camera matrix.

In the processing of evaluating the rate of match, the image processing apparatus 20 extracts line segments, such as the outer periphery of the house and the road, from each of the transformation result obtained by transforming the map data into the image coordinates and the captured image, and calculates an evaluation value for quantitatively evaluating the rate of match between the line segments. One line segment is specified by coordinates of two points (starting point and end point). Here, the "rate of match" may be a degree of match including an allowable range with respect to at least one of, preferably a plurality of, a distance between the line segments, a difference in a length of the line segment, or a difference in an inclination angle of the line segment.

Figure 5:
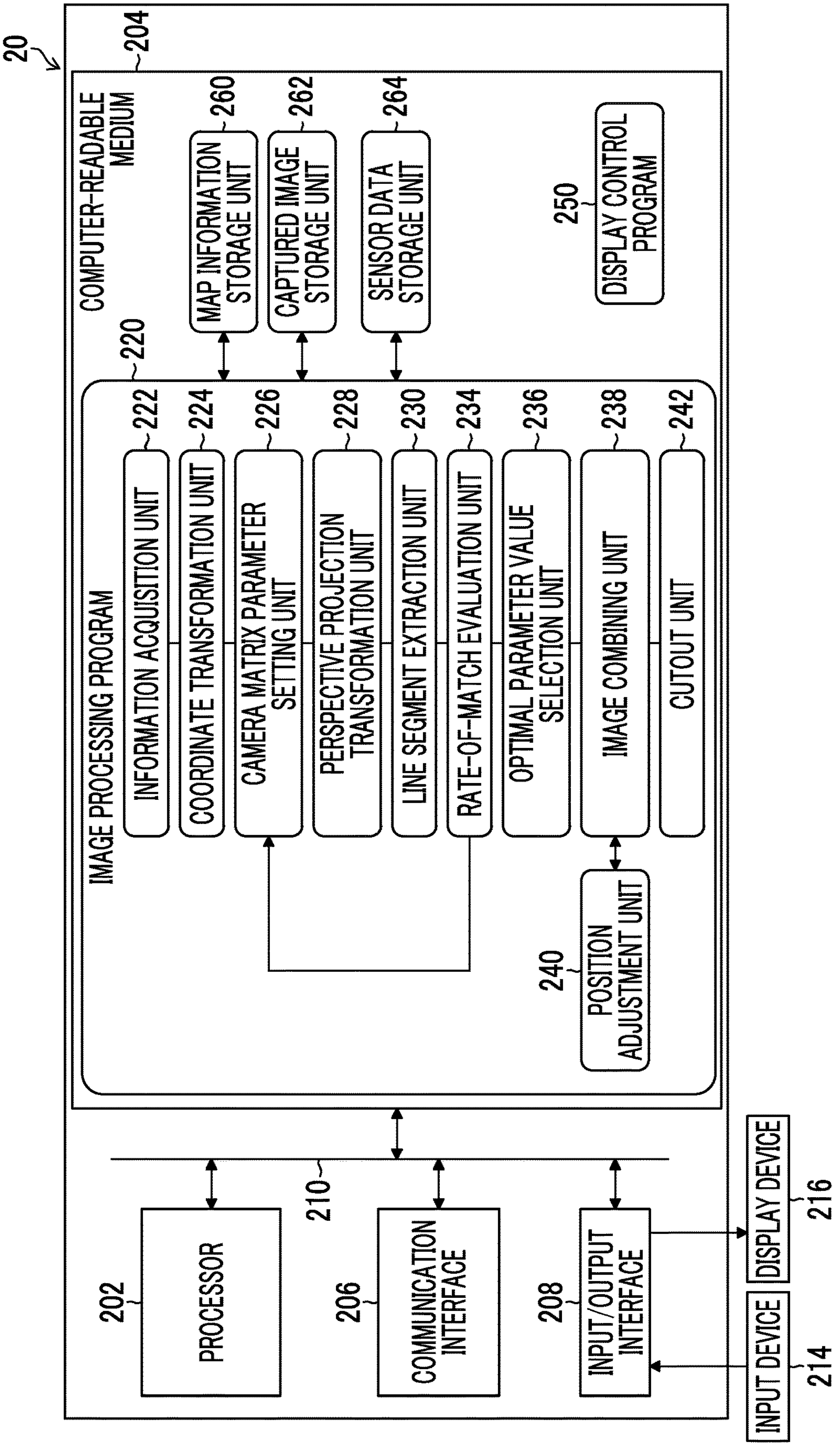
FIG. 5 is a block diagram showing a hardware configuration example of an image processing apparatus according to the embodiment.

FIG. 5 is a block diagram illustrating a hardware configuration example of the image processing apparatus 20. The image processing apparatus 20 includes a processor 202, a computer-readable medium 204, which is a non-transitory tangible object, a communication interface 206, and an input/output interface 208.

The processor 202 includes a central processing unit (CPU). The processor 202 may include a graphics processing unit (GPU). The processor 202 is connected to the computer-readable medium 204, the communication interface 206, and the input/output interface 208 via a bus 210.

The image processing apparatus 20 may comprise an input device 214 and a display device 216. The input device 214 and the display device 216 are connected to the bus 210 via the input/output interface 208. The input device 214 is configured by, for example, a keyboard, a mouse, a touch panel, other pointing devices, a voice input device, or an appropriate combination thereof. The input device 214 is an example of an "input unit" according to the present disclosure.

For example, the display device 216 is configured by a liquid crystal display, an organic electro-luminescence (OEL) display, a projector, or an appropriate combination thereof. The display device 216 is an example of a "display unit" according to the present disclosure.

The computer-readable medium 204 includes a memory as a main storage device, and a storage as an auxiliary storage device. For example, the computer-readable medium 204 may be a semiconductor memory, a hard disk drive (HDD) device, a solid state drive (SSD) device, or a combination thereof. The computer-readable medium 204 stores various programs including an image processing program 220 and a display control program 250, data, and the like.

The processor 202 executes a command of the image processing program 220 to function as processing units, such as an information acquisition unit 222, a coordinate transformation unit 224, a camera matrix parameter setting unit 226, a perspective projection transformation unit 228, a line segment extraction unit 230, a rate-of-match evaluation unit 234, an optimal parameter value selection unit 236, an image combining unit 238, a position adjustment unit 240, and a cutout unit 242. The computer-readable medium 204 includes a map information storage unit 260 that stores the map information, the captured image, and the sensor data which are acquired via the information acquisition unit 222, a captured image storage unit 262, and a sensor data storage unit 264.

Figure 6:
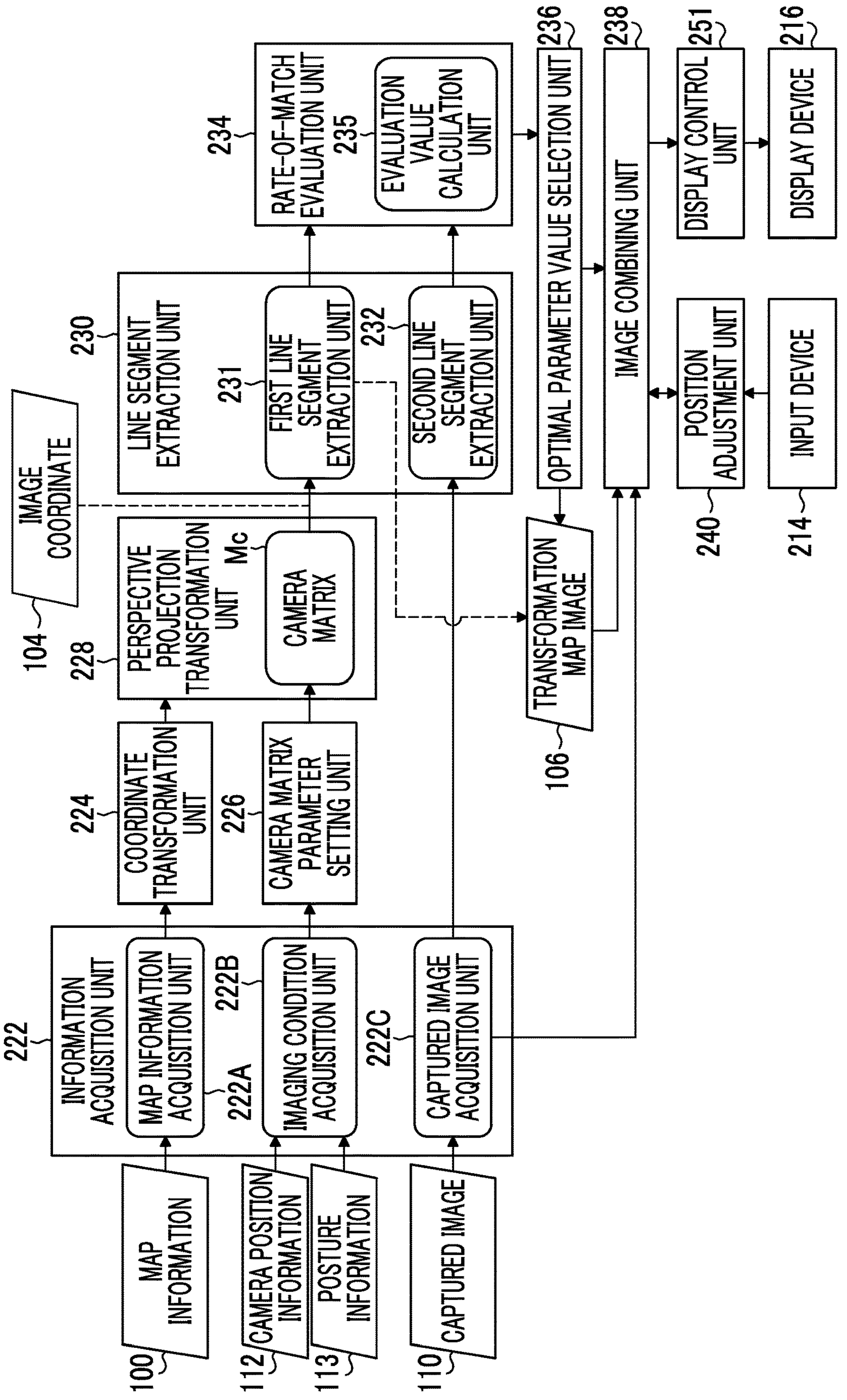
FIG. 6 is a functional block diagram showing a functional configuration of the image processing apparatus.

FIG. 6 is a functional block diagram showing a functional configuration of the image processing apparatus 20. The information acquisition unit 222 includes a map information acquisition unit 222A, an imaging condition acquisition unit 222B, and a captured image acquisition unit 222C. The map information acquisition unit 222A acquires map information 100. The map information 100 may be, for example, the basic map information of the Geographical Information Institute, the map information of the Open Street Map, or a combination thereof.

The imaging condition acquisition unit 222B acquires camera position information 112 and posture information 113 of the camera 14 as the imaging conditions in a case in which the captured image 110 is captured. The captured image 110 is associated with the camera position information 112 and the posture information 113 during the imaging. The camera position information 112 may be the position information obtained from the GPS receiver 30 of the drone 12, and includes the data of the latitude, the longitude, and the altitude. The data of the altitude in the camera position information 112 may be calculated based on the data obtained from the atmospheric pressure sensor 32. The posture information 113 includes the data of the azimuthal angle, the tilt angle, and the roll angle obtained from the azimuth sensor 34 and the gyro sensor 36. The tilt angle is a camera angle toward the ground, and is synonymous with an "inclination angle".

The coordinate transformation unit 224 transforms the position data including the data of the latitude and the longitude into rectangular coordinate data. The rectangular coordinate system may be, for example, a universal transverse mercator (UTM) coordinate system. The coordinate transformation unit 224 transforms the three-dimensional map data including the data of the latitude, the longitude, and the altitude into the UTM coordinates. In addition, the coordinate transformation unit 224 transforms the data of the latitude and the longitude included in the camera position information 112 during the imaging into the rectangular coordinate data (xc, yc), and transmits the transformed data to the camera matrix parameter setting unit 226.

The camera matrix parameter setting unit 226 decides a search range of the values of the parameters of a camera matrix Mc based on the camera position information 112 and the posture information 113 acquired via the imaging condition acquisition unit 222B, and sets and changes the parameter values within the search range. The parameters of the camera matrix Mc include a camera position (xc, yc, zc) during the imaging, and an azimuthal angle θh, a tilt angle θt, and a roll angle θr during the imaging. For the camera position (xc, yc, zc) during the imaging, the camera matrix parameter setting unit 226 sets the value of each of these six parameters. In addition, the camera matrix parameter setting unit 226 changes the value of each of the six parameters with a change amount (step width) determined in advance for each parameter, to change a combination of the values of the parameters.

The perspective projection transformation unit 228 performs the perspective projection transformation by using the camera matrix Mc of the parameter values set by the camera matrix parameter setting unit 226 to transform the three-dimensional rectangular coordinate data (x, y, z) into the two-dimensional image coordinates (u, v). The perspective projection transformation unit 228 transforms the three-dimensional rectangular coordinate data (x, y, z) of each of the plurality of specific points included in the map information 100 into the image coordinates (u, v). The transformed map image is obtained by mapping cach point indicated by the image coordinate data 104 of the transformation result by the perspective projection transformation unit 228 to the image coordinate system.

The line segment extraction unit 230 includes a first line segment extraction unit 231 and a second line segment extraction unit 232. The first line segment extraction unit 231 performs processing of extracting the line segment such as the outer periphery of the house from the map information (hereinafter, referred to as a transformation map) after the perspective projection transformation indicated by the image coordinate data 104 of the transformation result by the perspective projection transformation unit 228.

The second line segment extraction unit 232 performs processing of extracting the line segment from the captured image 110. For example, an existing method, such as a line segment detector (LSD), can be applied to the processing of extracting the line segment from the captured image 110.

The rate-of-match evaluation unit 234 evaluates the rate of match between the line segment (first line segment) extracted by the first line segment extraction unit 231 and the line segment (second line segment) extracted by the second line segment extraction unit 232. The rate-of-match evaluation unit 234 includes an evaluation value calculation unit 235 that calculates an evaluation value for quantifying the rate of match between the first line segment and the second line segment.

The rate of match means a degree of match, is not limited to exact match, and may be a degree in which a difference within an allowable range is accepted and determined to approximately match. As a method of quantifying the rate of match between two line segments to be contrasted, various methods can be applied. For example, the evaluation value calculation unit 235 may quantify at least one feature item of the position, the length, or the inclination of the line segment, to calculate the evaluation value.

The rate-of-match evaluation unit 234 performs comprehensive determination of the evaluation of the rate of match for a plurality of line segments extracted from each of the first line segment extraction unit 231 and the second line segment extraction unit 232, to obtain the evaluation value for each combination of the parameter values (that is, for each camera matrix Mc).

The optimal parameter value selection unit 236 selects the combination of the parameter values with the best evaluation record, based on the evaluation results of the rates of match for the transformation results of the plurality of camera matrixes Mc in which the parameter values are changed in the search range of the values of the parameters.

The camera matrix Mc capable of performing highly accurate registration between the captured image 110 and the map information 100 is decided by the combination of the optimal parameter values selected by the optimal parameter value selection unit 236.

In this manner, the three-dimensional coordinate data of the map information 100 is subjected to the perspective projection transformation into the image coordinates by using the camera matrix Mc decided by the automatic search for the parameter values using the line segment matching, and the transformation map image 106 subjected to the registration with the captured image 110 is generated from the transformation result. The transformation map image 106 can include at least one of the polygon PG indicating the shape of the house or the line RL indicating the road.

The image combining unit 238 performs processing of superimposing the captured image 110 and the transformation map image 106 on each other to generate the composite image.

The display control unit 251 generates data for display on the display device 216. The composite image generated by the image combining unit 238 is displayed on the display device 216 via the display control unit 251.

The position adjustment unit 240 receives an instruction to individually move the polygon PG indicating the shape of each house in the transformation map image 106, which is displayed by being superimposed on the captured image 110, on the captured image 110, and performs processing of moving the position of the polygon PG in accordance with the received instruction. The "movement" includes the concepts of parallel movement and rotational movement. The user can select the polygon to be moved and input the instruction to move the polygon from the input device 214.

<<Description of Perspective Projection Transformation Using Camera Matrix>>

Here, the calculation method of transforming the three-dimensional rectangular coordinate data (x, y, z) of the points constituting the outer periphery of the house included in the map information into the coordinates in a case of being projected onto the image sensor of the camera 14, that is, the image coordinates (u, v) will be described in detail. At the points (x, y, z) constituting the outer periphery of the house, x and y are values obtained by transforming the latitude and the longitude into the UTM coordinates which are the rectangular coordinate system, and z is the altitude. It should be noted that, in a case in which there is height information for the building such as the house, it is desirable to calculate a position of a roof on an image by using the height information. For the house without the height information, the position of the roof may be calculated, for example, on the assumption that the height is 6 m.

The camera position during the imaging is (xc, yc, zc). xc and yc are values obtained by transforming the latitude and the longitude of the camera position information 112 into the UTM coordinates, and zc is the altitude.

In addition, the camera posture during the imaging is specified by the azimuthal angle θh, the tilt angle θt, and the roll angle θr. The azimuthal angle θh is an angle from north based on north. The tilt angle θt is the camera angle (inclination angle) with respect to the ground. The roll angle θr is an inclination from the horizontal.

Figure 7:
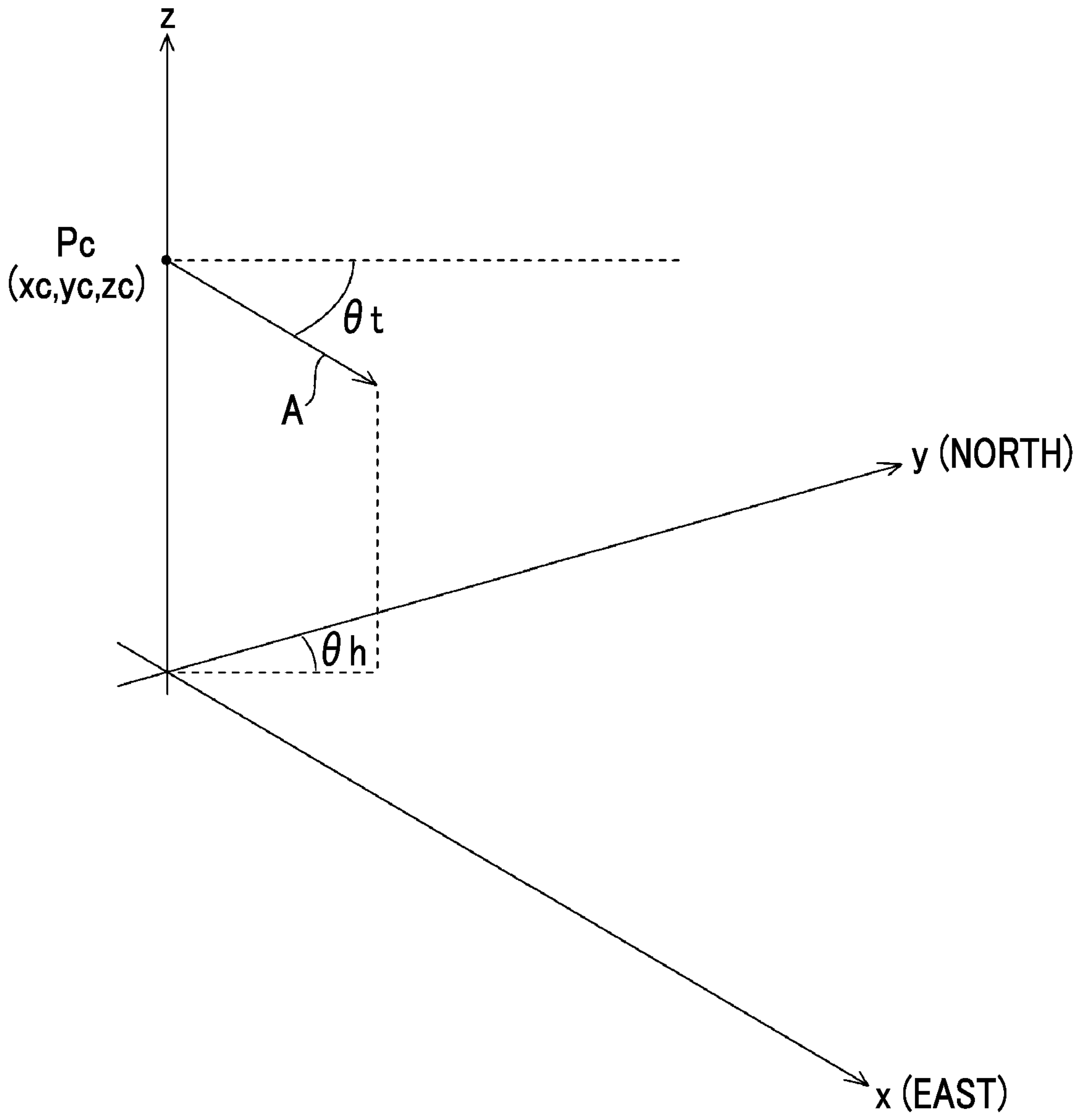
FIG. 7 is an explanatory diagram of definitions of six parameters indicating a camera position and a posture.

FIG. 7 shows an explanatory diagram of the definitions of six parameters indicating the camera position and the posture. In the UTM coordinate system, an x axis is defined as cast and a y axis is defined as north. In FIG. 7, the position of the camera 14 is Pc(xc, yc, zc). An arrow A represents an imaging direction of the camera 14.

An expression for transforming the coordinates of the points (x, y, z) constituting the outer periphery of the house into the origin of the projection center (that is, the camera position during the imaging) is indicated by Expression (1).

$$\begin{pmatrix} x' \\ y' \\ z' \end{pmatrix} = \begin{pmatrix} x - xc \\ y - yc \\ z - zc \end{pmatrix} \tag{1}$$

In addition, rotation matrixes Mh, Mt, and Mr are defined as follows.

$$Mh = \begin{pmatrix} \cos(\theta h) & -\sin(\theta h) & 0 \\ 0 & 0 & 1 \\ \sin(\theta h) & \cos(\theta t) & 0 \end{pmatrix} \tag{2}$$

$$Mt = \begin{pmatrix} 1 & 0 & 0 \\ 0 & \cos(\theta t) & -\sin(\theta t) \\ 0 & \sin(\theta t) & \cos(\theta t) \end{pmatrix} \tag{3}$$

$$Mr = \begin{pmatrix} \cos(\theta r) & -\sin(\theta r) & 0 \\ \sin(\theta r) & \cos(\theta r) & 0 \\ 0 & 0 & 1 \end{pmatrix} \tag{4}$$

The coordinates of the points constituting the outer periphery of the house with the projection center as the origin are transformed into the camera coordinates by Expression (5).

$$\begin{pmatrix} X \\ Y \\ Z \end{pmatrix} = Mr * Mt * Mh \begin{pmatrix} x' \\ y' \\ z' \end{pmatrix} \tag{5}$$

Figure 8:
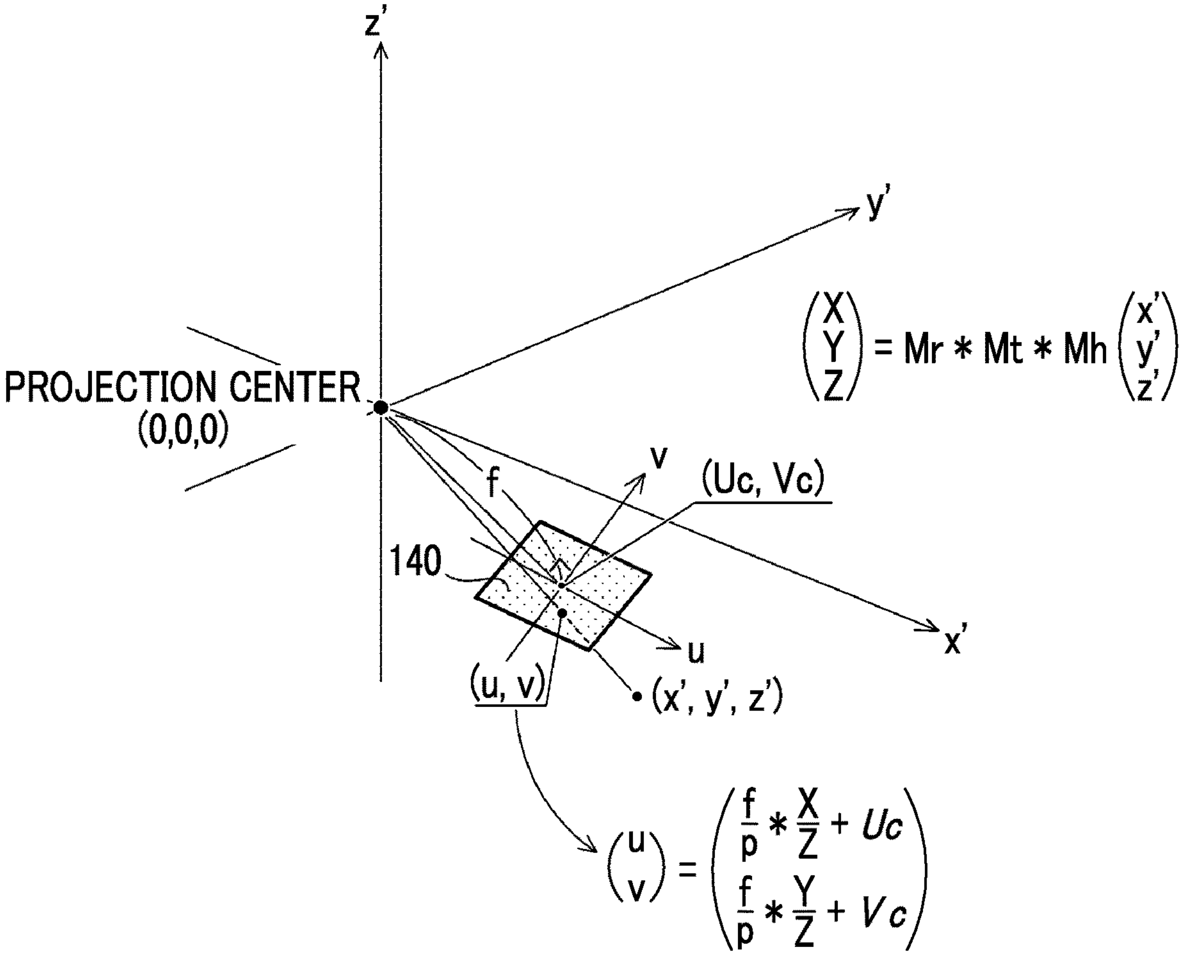
FIG. 8 is an explanatory diagram showing a relationship between a three-dimensional space coordinate system transformed into coordinates with a projection center as an origin and an image coordinate system.

An origin of the camera coordinates is a projection center, an X axis is a horizontal direction of the image sensor, a Y axis is a vertical direction of the image sensor, and a Z axis is a depth direction. FIG. 8 shows a relationship between a three-dimensional space coordinate system having three axes corresponding to the three-dimensional coordinates (x', y', z') by the coordinate transformation of Expression (1) and the image coordinate system by the image sensor 140 of the camera 14.

The point (unit of meter) of the camera coordinates obtained by Expression (5) is transformed into the coordinates (pixel unit) on the image by Expression (6).

$$\begin{pmatrix} u \\ v \end{pmatrix} = \begin{pmatrix} \frac{f}{p} * \frac{X}{Z} + Uc \\ \frac{f}{p} * \frac{Y}{Z} + Vc \end{pmatrix} \tag{6}$$

In Expression (6), f is a focal length, and p is a pixel pitch. The pixel pitch is a distance between the pixels of the image sensor 140, and is usually common in the vertical direction and the horizontal direction. Uc and Vc are image center coordinates (unit of pixel).

<<Example of Search for Optimal Parameter Value>>

An example of a specific procedure of the calculation method of the camera matrix Mc in the image processing apparatus 20 will be described. [Procedure 1] The processor 202 acquires the camera position and the posture during the imaging from the sensor data. The camera position (xc_0, yc_0, zc_0) and the camera posture (θh_0, θt_0, θr_0) acquired from the sensor data are used as reference values in the search for the parameter values.

[Procedure 2] The processor 202 sets the search range and the step width during the search for each of the six parameter values of the camera position and the posture. For example, the processor 202 decides a range of ±10 m from the reference value as a range to be searched for the x coordinate of the camera position, and 1 m as the step width. That is, the search range of the x coordinate of the camera position is set to "xc_0-10<xc<xc_0+10", and the step width during the search is set to 1 (unit of meter). xc−10 indicating a lower limit of the search range is an example of a search lower limit value, and xc+10 indicating an upper limit of the search range is an example of a search upper limit value.

The search range and the step width are also set for each parameter of the y coordinate and z coordinate of the camera position and the posture (θh, θt, θr). For example, the azimuthal angle θh is set in such a manner that the parameter value is changed with the step width of 1° using a range of +45° with respect to the reference value indicated by the sensor data as the search range. For each parameter, different search ranges and step widths can be set.

[Procedure 3] The processor 202 moves the step width of each of the six parameters of the camera position and the posture in each search range, to decide the combination of the parameter values. Then, the three-dimensional position data (latitude, longitude, and altitude) of the house and the road included in the map data are transformed into the coordinates on the two-dimensional image by using the decided combination of the parameter values (xc, yc, zc) (θh, θt, θr).

[Procedure 4] The processor 202 evaluates the image (transformation map image) of the transformation result obtained by mapping the positions of the house and the road transformed on the image in this manner and the captured image, by the line segment matching.

[Procedure 5] The processor 202 executes the procedures 3 and 4, changes the parameter values of the camera position and the posture by using all step widths in the search range of each parameter, and adopts the parameter values of the camera position and the posture with the best evaluation record of the evaluation value of the line segment matching, as correct camera position and posture. In this manner, an optimal camera matrix is automatically calculated for each captured image, and the transformation map image subjected to highly accurate registration with each captured image is obtained.

It should be noted that, regarding the search range of each parameter, it is not always necessary to perform the evaluation by using all the combinations of the parameter values, and a local search algorithm such as a hill climbing method may be used to find the optimal parameter value.

<<Outline of Automatic Registration by Line Segment Matching>>

Figure 9:
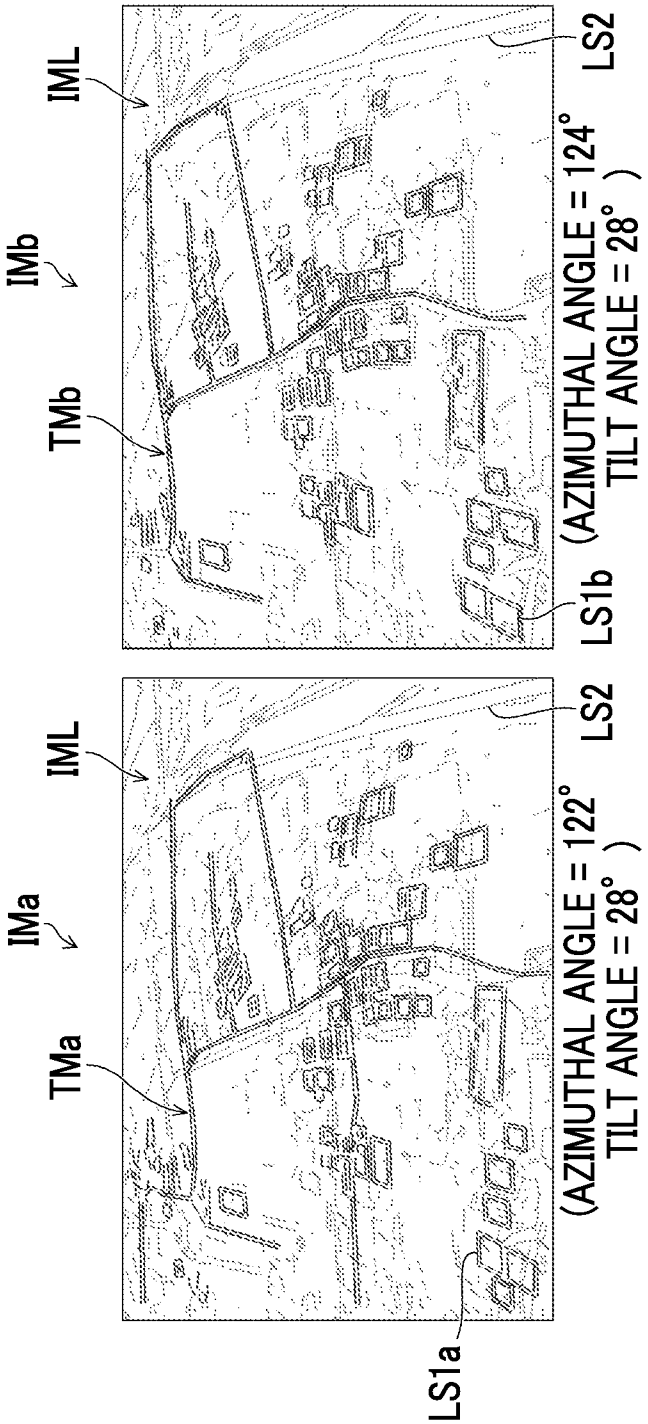
FIG. 9 is an explanatory diagram showing an example of automatic registration by line segment matching.

An image IMa shown on the left side of FIG. 9 is an image in which a transformation map image TMa composed of the line segments LS1*a* indicating the positions of the house and the road, which are subjected to the perspective projection transformation by using the camera matrix having a certain parameter value is superimposed on an imaging line segment image IML composed of the line segment LS2 extracted from the captured image. It can be seen that there is a misregistration between two images of the transformation map image TMa and the imaging line segment image IML, and the registration between the images is insufficient.

On the other hand, an image IMb shown on the right side of FIG. 9 is an image in which a transformation map image TMb composed of the line segments LS1*b* indicating the positions of the house and the road, which are subjected to the perspective projection transformation by using the camera matrix in which the values of the parameters of a part of the camera matrix applied to the generation of the image IMa are changed is superimposed on an imaging line segment image IML composed of the line segment LS2 extracted from the captured image. In the image IMb, it can be seen that the positions substantially match between two images of the transformation map image TMb and the imaging line segment image IML, and the registration between the images is appropriate. Each of the line segment LS1*a* and the line segment LS1*b* is an example of a "first line segment" according to the present disclosure, and the line segment LS2 is an example of a "second line segment" according to the present disclosure.

Here, for the sake of simplicity, the azimuthal angle θh is described as the changed parameter, but the parameter is not limited to the one type in practice, and a combination of the values of a plurality of parameters is changed.

The azimuthal angle θh of the camera matrix applied to the generation of the image IMa is 122° and the azimuthal angle θh of the camera matrix applied to the generation of the image IMb is 124°.

In the evaluation of whether or not the image registration between the captured image and the transformation map image is appropriate (whether or not the positions of the two images match), the processor 202 quantifies the degree of match of the image positions between the images.

For example, the processor 202 may compare the line segments extracted from the house, the road, and the like of the transformation result with the line segments extracted from the captured image of the geographical space including the house and the road, to calculate the number of matching line segments. In order to evaluate that the two line segments to be contrasted are "matching line segments", it is preferable that an allowable difference range is also defined as "match" without the limitation to a case in which the two line segments completely match, and the line segments satisfying the allowable range is handled as the "matching line segments". The allowable range regarded as the match may be defined with respect to, for example, each of the position of the line segment (distance between the line segments), the length of the line segment, or the inclination of the line segment, or a combination thereof.

The processor 202 performs the calculation for all the houses, the roads, and the like, and adds the number of matching line segments. The number of matching line segments is an example of an evaluation value.

The processor 202 repeats the same calculation while changing the parameter values of the camera position and the posture, and selects the value having the largest number of matching line segments as the optimal parameter value. Accordingly, the camera matrix having high registration accuracy of the images between the transformation map image and the captured image can be obtained.

Figure 10:
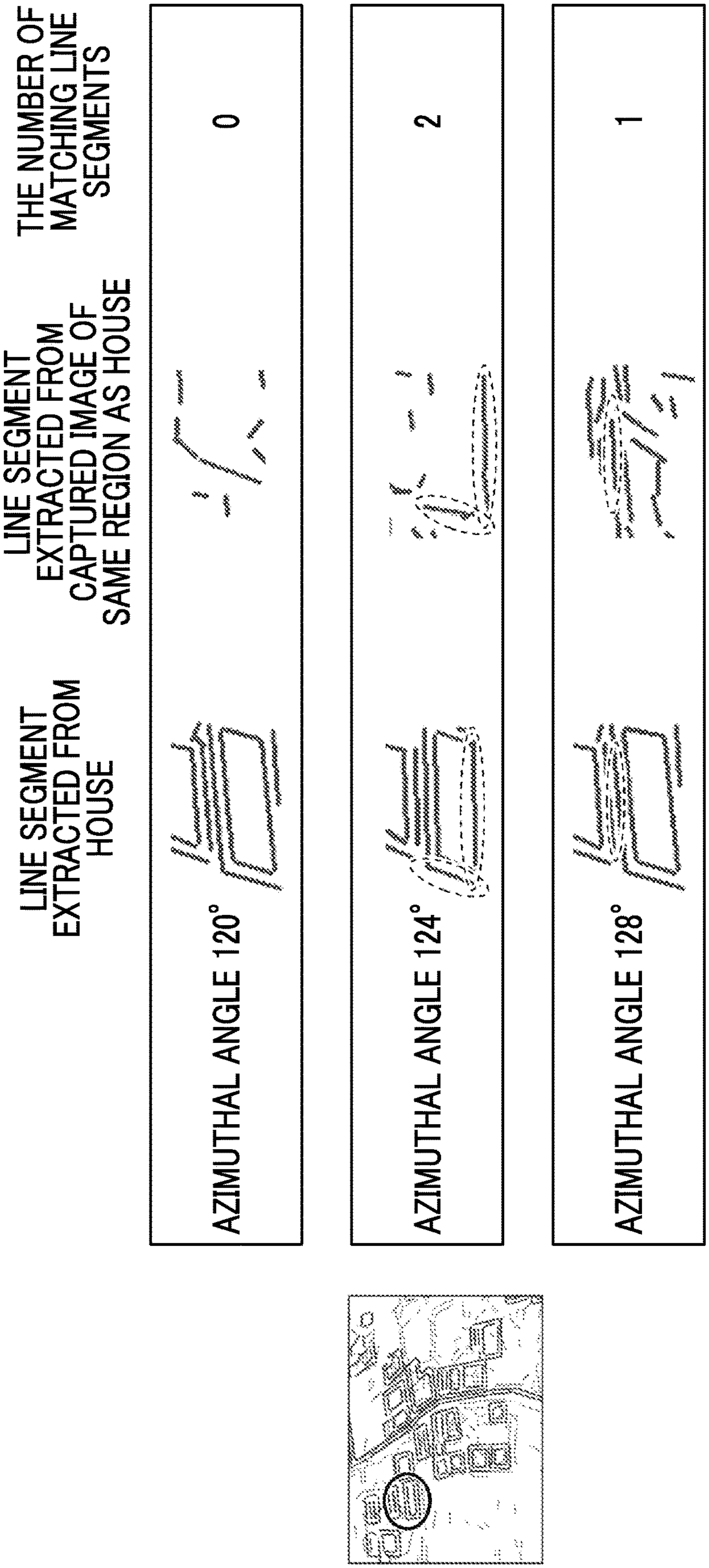
FIG. 10 is an explanatory diagram showing an extraction example of a line segment in a case in which a value of an azimuthal angle is changed, and an example of the number of matching line segments.

FIG. 10 is an explanatory diagram showing an extraction example of the line segment in a case in which the value of the azimuthal angle θh is changed, and an example of the number of matching line segments. Among the azimuthal angles of 120°, 124°, and 128° shown in FIG. 10, the rate of match between the line segments in a case of 124° is the highest. In FIG. 10, a line segment surrounded by an ellipse shown by a broken line is evaluated as the matching line segment. By the line segment matching method shown in FIG. 10, the processor 202 calculates the evaluation value of the rate of match between the line segments for the combination of the values of the 6 parameters, and decides a combination of the optimal parameter values.

Figure 11:
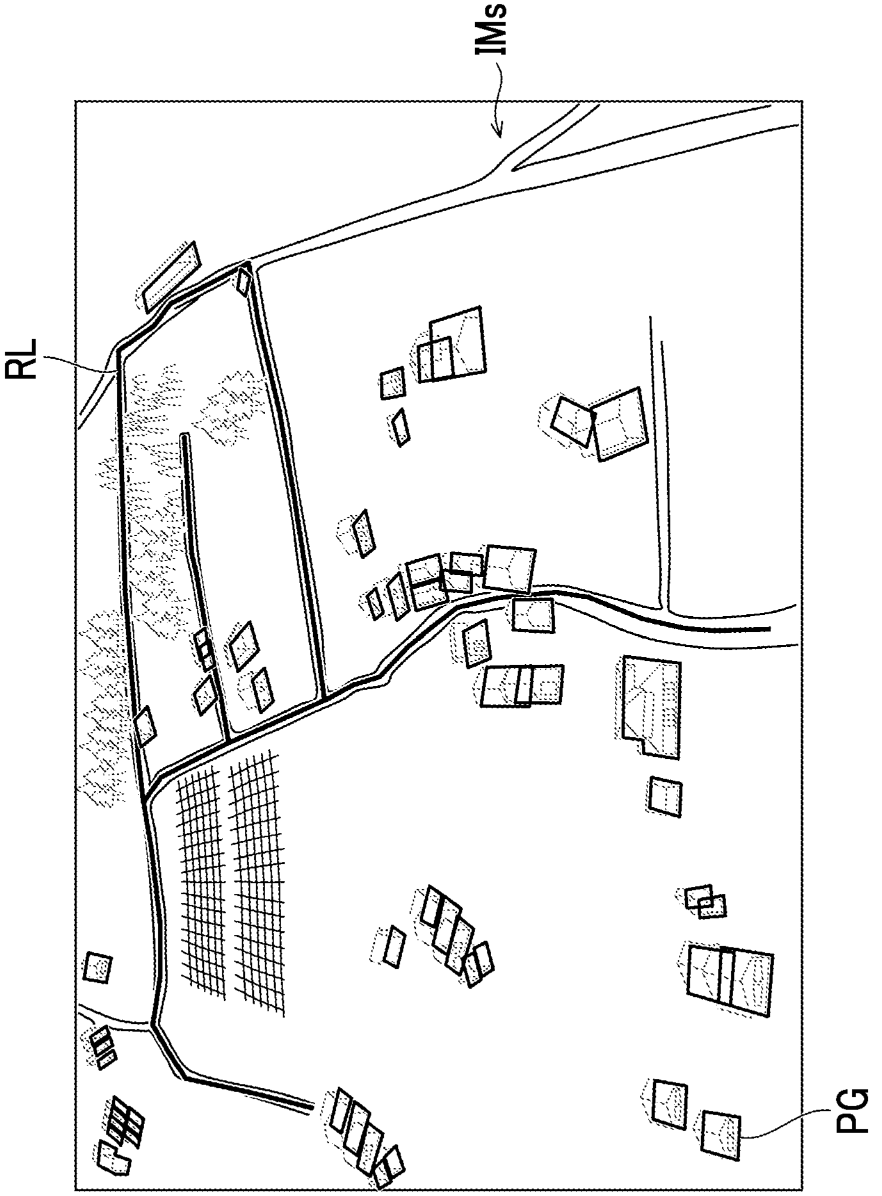
FIG. 11 is an example of a composite image obtained by performing registration between the captured image and map information based on a result of an automatic search for a parameter value using the line segment matching.

FIG. 11 is an example of a composite image obtained by performing the registration between the captured image and the map information based on the result of the automatic search for the parameter values using the line segment matching. As is clear from a comparison with FIG. 4, with the image processing apparatus 20 according to the present embodiment, highly accurate registration between the captured image and the map information can be performed.

<<Other Functions of Image Processing Apparatus 20>>

The image processing apparatus 20 may execute the following processing, in addition to the processing described above.

[1] Weighting Function in Evaluation of Line Segment Matching

The processor 202 may weights the evaluation of the rate of match between the line segments in the central portion of the screen and the rate of match between the line segments in the peripheral portion by putting emphasis on the registration in the central portion (near the central portion) of the screen in the captured image, to obtain a comprehensive evaluation value by emphasizing the rate of match in the central portion.

[2] Fine Adjustment Function of Registration

The processor 202 may have a manual position adjustment function of receiving the operation of moving the polygon PG indicating the position of each house on the image after automatically matching the map data including the position of the house with the captured image, and finely adjusting the position to a still more optimal position in accordance with the operation of the user.

[3] Combination of Automatic Matching and User Interface (UI)

Instead of an aspect in which the optimal parameter value with the best evaluation value record is automatically decided as a result of the search for the parameter value, a configuration may be adopted in which a plurality of results with a superior evaluation record of the line segment matching to the user, and the user selects one candidate that is determined to be optimal from among a plurality of candidates.

[4] Devising of Speed-Up of Processing of Automatic Matching

Since it takes a processing time to evaluate the rate of match between the line segments for all the houses included in the imaging target range, the house to be subjected to the line segment matching processing may be limited. For example, in a case in which the imaging is performed for the purpose of damage survey of a disaster, such as an earthquake or flood damage, an aspect can be adopted in which only a robust building is used for the registration based on attribute information of the building such as the house. In addition, since it is also assumed that the house disappears due to a fire or the like, an aspect can also be adopted in which the position information of only an element other than the house, for example, the road or river is used for the line segment matching.

[5] Cooperation with Processing of Cutting Out House

In a case in which correct registration between the captured image IMs and the map data MP is implemented, the region (partial image) of each house shown in the captured image IMs can be cut out by collating with the map data MP. The region of each house may have, for example, a configuration in which the region is cut out by a circumscribing rectangle encompassing the region of the house. In a case of cutting out the house, it is desirable to obtain the image coordinates for the shape of the roof by using the data of the height of the house in addition to the position data of the points constituting the outer periphery of the house, and to obtain an entire region of the house including the roof. The cut out image of the house is stored in association with the house ID.

[6] Cooperation with Automatic Determination Function of Degree of Damage to Residence The image of the house cut out from the captured image IMs is input to, for example, a processing unit of residence damage automatic determination artificial intelligence (AI) that automatically determines a degree of damage to a disaster-stricken house, and the determination of the degree of damage is performed. Accordingly, the efficiency of the work of the damage survey can be improved.

<<Example of Image Processing Method Executed by Image Processing Apparatus 20>>

Figure 12:
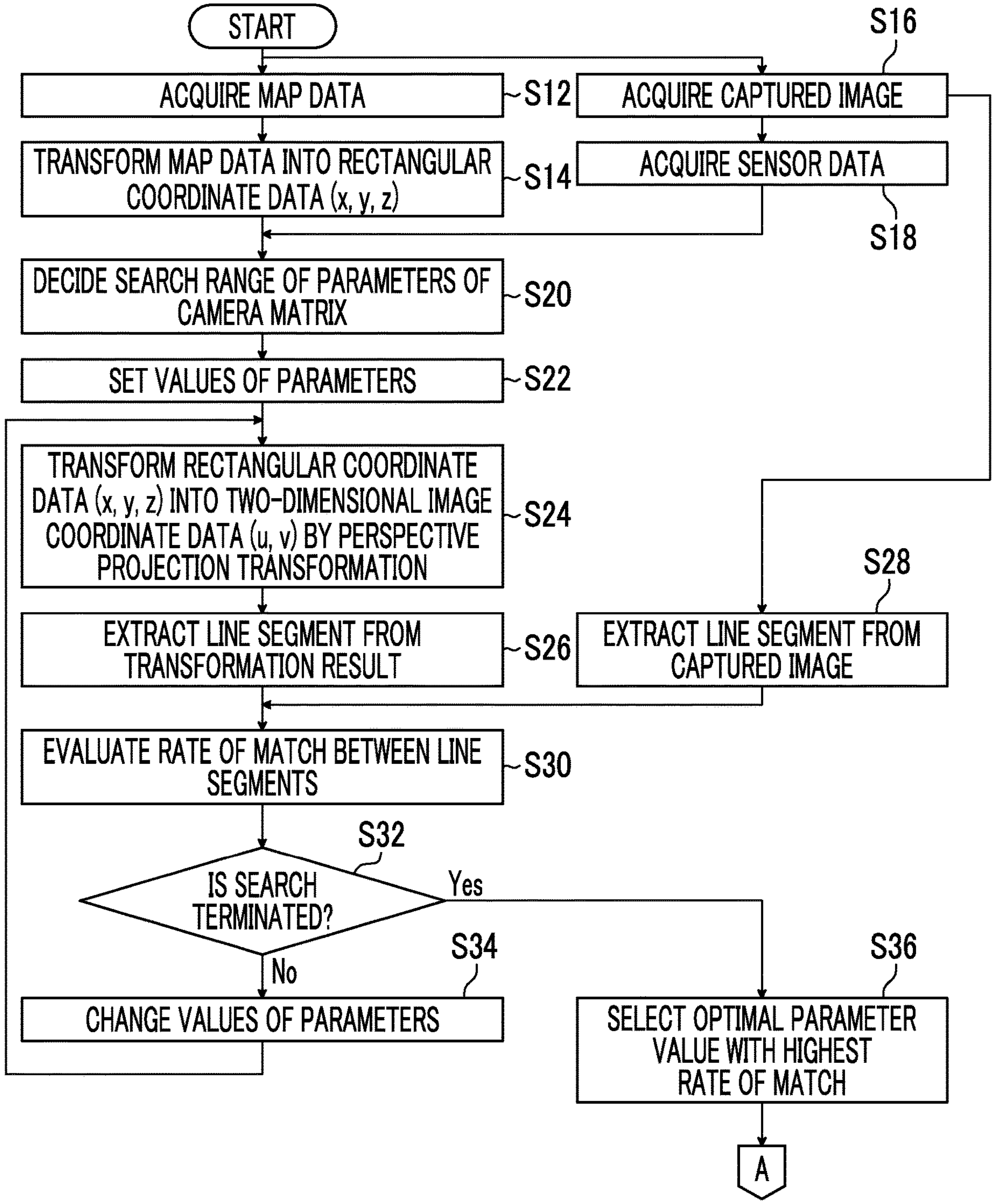
FIG. 12 is a flowchart illustrating an example of a flow of processing in the image processing apparatus.

FIG. 12 is a flowchart showing an example of a flow of the processing in the image processing apparatus 20. In step S12, the processor 202 acquires the map data of the imaging target range. The processor 202 may acquire the map data including the geographical space to be imaged in advance before the imaging, or may acquire the map data including the imaged geographical space after the imaging.

In step S14, the processor 202 transforms the map data of the three-dimensional map including the geographical coordinate data of the latitude and the longitude into rectangular coordinate data (x, y, z) such as the UTM coordinates.

In step S16, the processor 202 acquires the captured image captured by the camera 14. Further, in step S18, the processor 202 acquires the sensor data indicating the camera position and the posture during the imaging.

The order of processing in steps S12, S16, and S18 is not particularly limited, and the steps may be executed by parallel processing or juxtaposition processing.

After step S18, in step S20, the processor 202 decides the search range of the parameters of the camera matrix based on the acquired sensor data. The processor 202 decides a search range lower limit value and a search range upper limit value from the reference value indicated by the sensor data for each of the six parameters. A step width of the parameter values in each parameter may be determined in advance.

In step S22, the processor 202 sets the value of each parameter within the decided search range. An initial setting value of the parameter may be the reference value indicated by the sensor data, a search lower limit value, a search upper limit value, or the like.

Next, in step S24, the processor 202 transforms the rectangular coordinate data (x, y, z) of the plurality of specific points included in the map data into the two-dimensional image coordinate data (u, v) by the perspective projection transformation using the camera matrix of the set parameter value.

In step S26, the processor 202 extracts the line segment from the transformation result. By mapping each point of the image coordinate data of the transformation result on the coordinates and connecting the points in a unit of each house with a straight line (line segment), the polygon including the line segment indicating the shape of the house can be generated.

In addition, by connecting a plurality of points indicating the position of the road, the river, or the like with the straight line, the line segment indicating the shape of the road, the river, or the like can be generated. Generating the line segment based on the image coordinate data of the transformation results of the plurality of specific points of the transformation result in this manner is included in the concept of “extracting” the line segment. The line segment extracted from the transformation result is an example of a “first line segment” according to the present disclosure.

On the other hand, in step S28, the processor 202 extracts the line segment from the acquired captured image. The line segment extracted from the captured image is an example of a “second line segment” according to the present disclosure.

Next, in step S30, the processor 202 evaluates the rate of match between the line segment extracted from the transformation result and the line segment extracted from the captured image. The processor 202 calculates the evaluation value for quantifying the degree of match between the line segments. In the calculation of the matching between the line segments, the processor 202 can calculate the evaluation value of the matching by using the height data of the building, in addition to the position data of the points constituting the outer periphery of the ground surface of the house, and using the line segment of the shape of the roof of the house.

In step S32, the processor 202 determines whether or not to terminate the search for the parameter values. In a case in which there is a combination in which the evaluation value is not calculated among the combinations of the parameter values by the respective step widths within the search ranges of the plurality of parameters, a No determination can be made as the determination result in step S32. In a case where a No determination is made as the determination result in step S32, the processor 202 proceeds to step S34.

In step S34, the processor 202 changes the values of the parameters within the search range, and returns to step S24. The processor 202 executes steps S24 to S34 a plurality of times until a Yes determination is made in step S32.

In a case in which steps S24 to S34 are repeatedly executed a plurality of times and the evaluation value is calculated for all the combinations of the parameter values by the respective step widths within the search range of each parameter, a Yes determination can be made as the determination result in step S32.

In a case where a Yes determination is made as the determination result in step S32, the processor 202 proceeds to step S36.

In step S36, the processor 202 selects the optimal parameter value with the highest rate of match based on the plurality of evaluation values repeatedly calculated while changing the parameter values. In a case of the selection, the parameter value actually used in the search may be adopted, or the maximum value may be estimated by an interpolation operation or the like based on the parameter value discretely changed in the unit of the step width.

Figure 13:
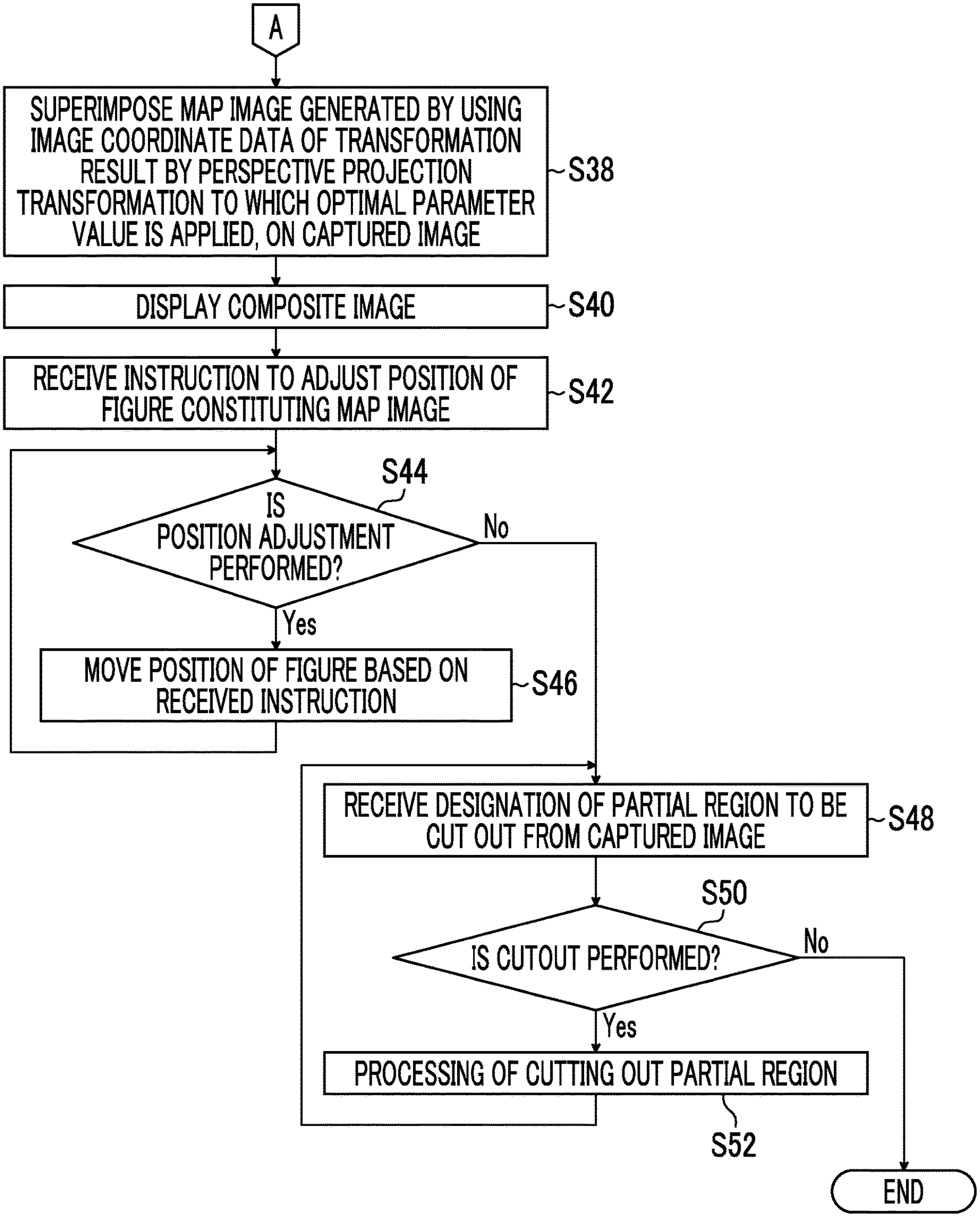
FIG. 13 is a flowchart illustrating an example of the flow of the processing in the image processing apparatus.

After step S36, the processor 202 proceeds to step S38 of FIG. 13.

In step S38, the processor 202 superimposes, on the captured image, the transformation map image generated by using the image coordinate data of the transformation result by the perspective projection transformation defined by the optimal parameter value decided by the automatic matching. The transformation map image is subjected to the highly accurate registration with the captured image, and the composite image in which the positions of the house and the like included in the map data are appropriately associated with each other on the captured image is obtained.

In step S40, the processor 202 displays the generated composite image on the display device 216. The processor 202 may display the generated composite image on the display 16A of the remote controller 16 and/or the terminal apparatus 24.

In step S42, the processor 202 receives an instruction to adjust a position of a figure constituting the transformation map image. The figure referred to here includes a line drawing of the polygon PG indicating the shape of each house. The user can select the figure to be moved or designate a position of a movement destination of the figure by using the user interface, such as the input device 214. In addition, in a case in which a determination is made that the position adjustment is not necessary, the user can input an instruction to store the result of the registration.

In step S44, the processor 202 determines whether or not to adjust the position of the figure. In a case in which the figure to be moved is selected and the position of the movement destination is designated, a Yes determination is made as the determination result in step S44, and the processor 202 proceeds to step S46.

In step S46, the processor 202 moves the position of the figure based on the received instruction. After step S46, the processor 202 returns to step S44.

In a case in which a No determination is made in the determination result in step S44, that is, in a case in which further position adjustment is not necessary, the processor 202 proceeds to step S48.

In step S48, the processor 202 receives the designation of a partial region to be cut out from the captured image. The partial region to be cut out may be a region of each house.

The user can designate a target house of the cutout processing, by using the UI such as the input device 214. An operation of individually designating target houses may be received, or a region including a plurality of houses may be designated to designate each of the plurality of houses included in the designated region as the target house of the cutout processing. In addition to the operation of the individual house designation or the operation of the comprehensive designation of the plurality of houses in the designated region, an operation menu such as "whole house batch selection" for designating all the houses in the captured image may be provided.

In step S50, the processor 202 determines whether or not to perform the cutout. In a case where a Yes determination is made as the determination result in step S50, the processor 202 proceeds to step S52.

In step S52, the processor 202 performs processing of cutting out the partial region corresponding to an image area of the house from the captured image, in accordance with the designation. The cut out image of the house is stored in the computer-readable medium 204 of the image processing apparatus 20 and/or a storage device (not shown), in association with the house ID.

The cut out image of the house is input to, for example, an image recognition device (not shown), and a damage status of the house is automatically discriminated by the image recognition. The image recognition device may be configured to use a trained model that is trained through machine learning. A processing function of the image recognition device may be incorporated into the image processing apparatus 20, or may be implemented in an image processing server, a cloud server, or the like (not shown) connected via the network 22.

On the other hand, in a case in which a No determination is made as the determination result in step S50, the processor 202 terminates the flowcharts of FIGS. 12 and 13.

<<Program Causing Computer to Operate>>

A program for implementing the processing function of the image processing apparatus 20 in the computer can be provided by being recorded in the computer-readable medium, which is the non-transitory tangible information storage medium such as an optical disk, a magnetic disk, or a semiconductor memory, and being transmitted via the information storage medium.

Also, instead of the aspect in which the program is stored in such a tangible non-transitory computer-readable medium and provided, a program signal can be provided as a download service by using an electric telecommunication line, such as the Internet.

Further, a part or all of the processing functions in the image processing apparatus 20 may be implemented by cloud computing, or can be provided as service of software as a service (SaaS).

<<Hardware Configuration of Each Processing Unit>>

The hardware structures of the processing units that execute various types of processing, such as the information acquisition unit 222, the coordinate transformation unit 224, the camera matrix parameter setting unit 226, the perspective projection transformation unit 228, the line segment extraction unit 230, the rate-of-match evaluation unit 234, the optimal parameter value selection unit 236, the image combining unit 238, the position adjustment unit 240, and the display control unit 251 of the image processing apparatus 20, are the following various processors.

The various processors include the CPU that is a general-purpose processor that executes the program and functions as the various processing units, the GPU that is a processor specialized in the image processing, a programmable logic device (PLD) that is a processor of which a circuit configuration can be changed after manufacture, such as a field programmable gate array (FPGA), and a dedicated electric circuit that is a processor having a circuit configuration designed for exclusive use to execute specific processing, such as an application specific integrated circuit (ASIC).

One processing unit may be configured by one of these various processors or may be configured by two or more processors of the same type or different types. For example, one processing unit may be configured by a plurality of FPGAs, a combination of a CPU and an FPGA, or a combination of a CPU and a GPU. In addition, a plurality of the processing units may be configured by one processor. As an example in which the plurality of processing units are configured by one processor, first, there is a form in which one processor is configured by a combination of one or more CPUs and software, and this processor functions as the plurality of processing units, as represented by a computer, such as a client or a server. Second, there is a form in which a processor, which implements the functions of the entire system including the plurality of processing units with one integrated circuit (IC) chip, is used, as represented by a system on chip (SoC) or the like. As described above, various processing units are configured by one or more of the various processors described above, as the hardware structure.

Further, the hardware structure of these various processors is, more specifically, an electric circuit (circuitry) in which circuit elements, such as semiconductor elements, are combined.

<<Advantages of Present Embodiment>>

The image processing apparatus 20 according to the embodiment has the advantages described below.

[1] With the image processing apparatus 20, since the values of the parameters of the camera matrix are automatically searched for, based on the sensor data obtained from the drone 12, and the optimal parameter value is selected, the designation of the correspondence point by a person is not necessary, and highly accurate registration between the map data of the imaging target range and the captured image can be performed.

[2] With the image processing apparatus 20, the composite image obtained by the automatic registration can be displayed, and the position of the figure indicating the region of each house can be moved on the image in accordance with the instruction from the user and can be adjusted to an optimal position. Accordingly, the result of the automatic registration can be further improved by the manual operation by the user, and the accuracy of the registration can be improved in a unit of the house.

<<Modification Example 1>>

The processing function of the image processing apparatus 20 may be implemented by a plurality of computers or cloud computing. The processing function of the image processing apparatus 20 may be implemented in the remote controller 16 and/or the terminal apparatus 24.

<<Modification Example 2>>

In the embodiment described above, the example of processing the still image as the captured image is described. However, the camera 14 may capture the moving image, and the image processing apparatus 20 may extract some frames from the captured moving image to perform the same processing.

<<Modification Example 3>>

The calculation method of the rate of match described with reference to FIG. 10 and the calculation method of the rate of match described as the function of the rate-of-match evaluation unit 234 are merely examples, the method of evaluating the rate of match is not limited to the examples described above, and another method may be applied.

<<Other Application Examples>>

In the embodiment described above, the case in which the captured image captured by the camera 14 mounted on the drone 12 is processed is described, but an application range of the present disclosure is not limited to this example. For example, an image captured by using a camera installed at a high location overlooking the ground, such as a roof of a building or a top of a steel tower, is included in the concept of the "image captured from the air". Even in a case of a fixed point camera, the posture of the camera can be changed by a pan and tilt operation. In a case in which the camera position is fixed, the values of the parameters of the camera position in the camera matrix may be fixed, and a configuration can be adopted in which only the values of the parameters related to the posture are searched for.

The technique of the present disclosure is not limited to the association between the position information (geographical coordinates) in the geographical space, the geographical coordinates, and the image coordinates of the captured image, and can be widely applied to a case in which processing of associating the three-dimensional spatial coordinates with the image coordinates of the captured image is performed. For example, the technique of the present disclosure can be applied to a case in which a three-dimensional coordinate system is defined in a specific space such as an indoor ball stadium, an indoor stadium, an amusement facility, an imaging studio, or a factory, the coordinate data of the plurality of specific points in the space and the image coordinates of the captured image are associated with each other. A captured image captured by using a camera installed on a ceiling of the indoor ball stadium or the like, a camera suspended from a wire, or the like is included in the concept of the "image captured from the air".

<<Others>>

The present disclosure is not limited to the embodiment described above, and various modifications can be made without departing from the spirit of the technical idea of the present disclosure.

EXPLANATION OF REFERENCES

10: captured image processing system
12: drone
13: gimbal head
14: camera
16: remote controller
16A: display
20: image processing apparatus
22: network
24: terminal apparatus
24A: display
30: GPS receiver
32: atmospheric pressure sensor
34: azimuth sensor
36: gyro sensor
38: motor
40: processor
42: storage device
44: communication interface
100: map information

104: image coordinate data
106: transformation map image
110: captured image
112: camera position information
113: posture information
140: image sensor
202: processor
204: computer-readable medium
206: communication interface
208: input/output interface
210: bus
214: input device
216: display device
220: image processing program
222: information acquisition unit
222A: map information acquisition unit
222B: imaging condition acquisition unit
222C: captured image acquisition unit
224: coordinate transformation unit
226: camera matrix parameter setting unit
228: perspective projection transformation unit
230: line segment extraction unit
231: first line segment extraction unit
232: second line segment extraction unit
234: rate-of-match evaluation unit
235: evaluation value calculation unit
236: optimal parameter value selection unit
238: image combining unit
240: position adjustment unit
242: cutout unit
250: display control program
251: display control unit
260: map information storage unit
262: captured image storage unit
264: sensor data storage unit
IM, IMs: captured image
IMa: image
IMb: image
IML: imaging line segment image
TMa: transformation map image
TMb: transformation map image
LS1*a*: line segment
LS1*b*: line segment
LS2: line segment
MP: map data
PG: polygon
RL: line
S12 to S52: steps of image processing method

What is claimed is:

1. An image processing apparatus comprising:
one or more processors; and
one or more memories that store a program to be executed by the one or more processors,
wherein the one or more processors execute a command of the program to
acquire a captured image captured by using a camera,
acquire three-dimensional position information indicating positions of a plurality of specific points in a space of an imaging target range,
set a value of a parameter of perspective projection transformation of transforming the three-dimensional position information into two-dimensional image coordinates based on an imaging condition of the captured image,
transform three-dimensional rectangular coordinate data that is the position information of each of the plurality of specific points into data of the image coordinates by using the perspective projection transformation,
extract a first line segment that is a point-to-point straight line based on a plurality of pieces of data of the image coordinates obtained by the perspective projection transformation,
extract a second line segment that is a straight-line portion included in the captured image from the captured image,
evaluate a rate of match between the first line segment and the second line segment,
perform the evaluation of the rate of match a plurality of times while changing the value of the parameter of the perspective projection transformation, and
associate the captured image with the positions of the plurality of specific points based on results of the evaluation performed a plurality of times.

2. The image processing apparatus according to claim 1, wherein the captured image is an image captured from the air.

3. The image processing apparatus according to claim 1, wherein the plurality of specific points are points in a geographical space of the imaging target range.

4. The image processing apparatus according to claim 1, wherein the one or more processors
acquire map data corresponding to the imaging target range, and
acquire the position information of the plurality of specific points from the map data.

5. The image processing apparatus according to claim 4, wherein the map data includes data of latitude, longitude, and altitude, and
the one or more processors transform the map data into rectangular coordinate data.

6. The image processing apparatus according to claim 1, wherein the plurality of specific points include points of specifying a shape of a house.

7. The image processing apparatus according to claim 1, wherein the plurality of specific points include points of specifying a position of a road.

8. The image processing apparatus according to claim 1, wherein a transformation matrix used for the perspective projection transformation includes a plurality of the parameters, and
the one or more processors perform the evaluation of the rate of match a plurality of times while changing a combination of values of the plurality of parameters.

9. The image processing apparatus according to claim 8, wherein the plurality of parameters are parameters related to a position and a posture of the camera that captures the captured image.

10. The image processing apparatus according to claim 1, wherein the captured image is an image captured by using the camera mounted on a flying object, and
the one or more processors
acquire camera position information indicating a position of the camera during capturing of the captured image and posture information indicating a posture of the camera during the capturing of the captured image, and
decide a search range in which the value of the parameter is searched for, based on the camera position information and the posture information.

11. The image processing apparatus according to claim 10, wherein the camera position information includes data of latitude, longitude, and altitude, and the posture information includes data of an azimuthal angle, a tilt angle, and a roll angle indicating an inclination from horizontal.

12. The image processing apparatus according to claim 10, wherein the camera position information and the posture information are acquired from sensor data obtained by a sensor disposed in at least one of the camera or the flying object.

13. The image processing apparatus according to claim 1, wherein the one or more processors make a weight for the evaluation of the rate of match different between a central portion and a peripheral portion of the captured image.

14. The image processing apparatus according to claim 1, wherein the one or more processors select the value of the parameter at which the rate of match is highest, based on the results of the evaluation performed a plurality of times.

15. The image processing apparatus according to claim 14, wherein the one or more processors generate a composite image in which the first line segment generated by using the perspective projection transformation defined by the selected value of the parameter is superimposed on the captured image.

16. The image processing apparatus according to claim 15, wherein the plurality of specific points include points of specifying a shape of a house, and the composite image is an image in which a figure indicating a region of the house using the first line segment is superimposed on the captured image.

17. The image processing apparatus according to claim 16, wherein the one or more processors receive input of an instruction to move the figure indicating the region of the house displayed by being superimposed on the captured image, and move the figure on the captured image in accordance with the input instruction.

18. The image processing apparatus according to claim 16, wherein the one or more processors cut out an image area of the house surrounded by the figure from the captured image.

19. The image processing apparatus according to claim 1, wherein the one or more processors perform processing of displaying a plurality of results with superior evaluation records among the evaluations performed a plurality of times, and receive an instruction to select one result from among the plurality of results with the superior evaluation records.

20. The image processing apparatus according to claim 19, wherein the one or more processors generate a composite image in which the first line segment generated by using the perspective projection transformation defined by the value of the parameter corresponding to the selected result is superimposed on the captured image in accordance with the received instruction.

21. The image processing apparatus according to claim 1, further comprising:

a display unit that displays a result of the association between the captured image and the positions of the plurality of specific points; and an input unit for inputting an instruction from a user.

22. The image processing apparatus according to claim 1, wherein the one or more processors generate the first line segment by connecting points of the data of the image coordinates obtained by the transformation.

23. An image processing method executed by one or more processors, the image processing method comprising:

causing the one or more processors to acquire a captured image captured by using a camera, acquire three-dimensional position information indicating positions of a plurality of specific points in a space of an imaging target range, set a value of a parameter of perspective projection transformation of transforming the three-dimensional position information into two-dimensional image coordinates based on an imaging condition of the captured image, transform three-dimensional rectangular coordinate data that is the position information of each of the plurality of specific points into data of the image coordinates by using the perspective projection transformation, extract a first line segment that is a point-to-point straight line based on a plurality of pieces of data of the image coordinates obtained by the perspective projection transformation, extract a second line segment that is a straight-line portion included in the captured image from the captured image, evaluate a rate of match between the first line segment and the second line segment, perform the evaluation of the rate of match a plurality of times while changing the value of the parameter of the perspective projection transformation, and associate the captured image with the positions of the plurality of specific points based on results of the evaluation performed a plurality of times.

24. A non-transitory, computer-readable tangible recording medium which records thereon a program causing, when read by a computer, the computer to implement:

a function of acquiring a captured image captured by using a camera;

a function of acquiring three-dimensional position information indicating positions of a plurality of specific points in a space of an imaging target range;

a function of setting a value of a parameter of perspective projection transformation of transforming the three-dimensional position information into two-dimensional image coordinates based on an imaging condition of the captured image;

a function of transforming three-dimensional rectangular coordinate data that is the position information of each of the plurality of specific points into data of the image coordinates by using the perspective projection transformation;

a function of extracting a first line segment that is a point-to-point straight line based on a plurality of pieces of data of the image coordinates obtained by the perspective projection transformation;

a function of extracting a second line segment that is a straight-line portion included in the captured image from the captured image;

a function of evaluating a rate of match between the first line segment and the second line segment;

a function of performing the evaluation of the rate of match a plurality of times while changing the value of the parameter of the perspective projection transformation; and a function of associating the captured image with the positions of the plurality of specific points based on results of the evaluation performed a plurality of times.

* * * * *